(12) United States Patent
Szeliski et al.

(10) Patent No.: US 6,600,491 B1
(45) Date of Patent: Jul. 29, 2003

(54) VIDEO-BASED RENDERING WITH USER-CONTROLLED MOVEMENT

(75) Inventors: Richard S. Szeliski, Bellevue, WA (US); David Salesin, Seattle, WA (US); Arno Schödl, Berlin (DE)

(73) Assignee: Microsoft Corporation, Redmond, WA (US)

( * ) Notice: Subject to any disclaimer, the term of this patent is extended or adjusted under 35 U.S.C. 154(b) by 323 days.

(21) Appl. No.: 09/643,782

(22) Filed: Aug. 22, 2000

Related U.S. Application Data

(63) Continuation-in-part of application No. 09/583,313, filed on May 30, 2000.

(51) Int. Cl.⁷ .............................................. G06T 15/70
(52) U.S. Cl. ................... 345/473; 345/474; 345/422; 345/421; 345/723; 348/700
(58) Field of Search ................... 345/419, 421, 345/422, 473–475, 629–633, 640, 683; 348/152, 155, 699–701; 382/173, 236; 708/203

(56) References Cited

U.S. PATENT DOCUMENTS

| | | | | |
|---|---|---|---|---|
| 5,627,765 A | * | 5/1997 | Robotham et al. | 708/203 |
| 5,726,713 A | * | 3/1998 | Panis | 348/699 |
| 5,943,445 A | * | 8/1999 | Dufaux | 382/173 |
| 5,990,980 A | * | 11/1999 | Golin | 348/700 |
| 6,111,590 A | * | 8/2000 | Boezeman et al. | 345/474 |

* cited by examiner

*Primary Examiner*—Mano Padmanabhan
(74) *Attorney, Agent, or Firm*—Lyon & Harr, LLP; Richard T. Lyon

(57) ABSTRACT

A system and process for generating a video animation from the frames of a video sprite with user-controlled motion is presented. An object is extracted from the frames of an input video and processed to generate a new video sequence or video sprite of that object. In addition, the translation velocity of the object for each frame is computed and associated with each frame in the newly generated video sprite. The system user causes a desired path to be generated for the object featured in the video sprite to follow in the video animation. Frames of the video sprite showing the object of interest are selected and inserted in a background image, or frame of a background video, along the prescribed path. The video sprite frames are selected by comparing a last-selected frame to the other video sprite frames, and selecting a video sprite frame that is identified in the comparison as corresponding to an acceptable transition from the last-selected frame. Each newly selected video sprite frame is inserted at a point along the prescribed path dictated by the velocity associated with the object in the last-inserted frame. The process of selecting, inserting and comparing video sprite frames to create successive frames of the video animation continues for as long as it is desired to produce new frames of the video animation.

21 Claims, 15 Drawing Sheets

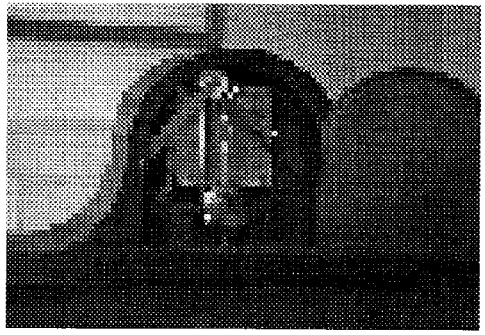
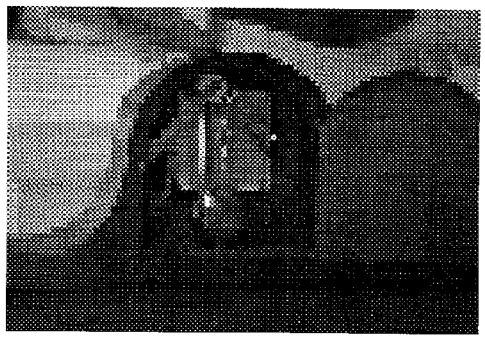
FIG. 6A  FIG. 6B
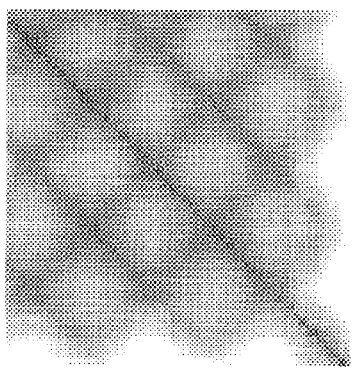
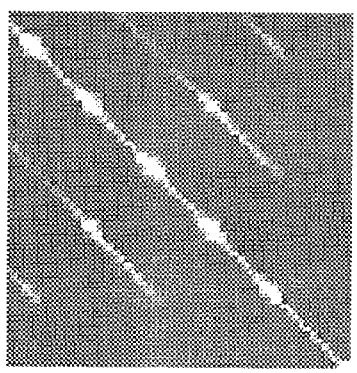
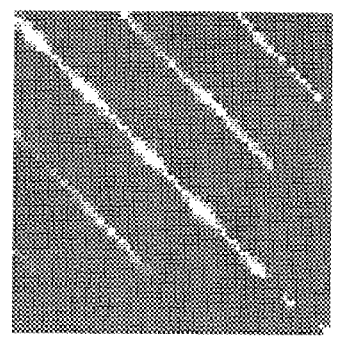
$D^t_{ij}$  $P^t_{ij}$  with future cost
FIG. 7A  FIG. 7B  FIG. 7C

| length | A(2) | B(3) | C(4) | D(5) |
|---|---|---|---|---|
| 1 |  | $B(3)$ |  |  |
| 2 |  | $B^2(6)$ |  | $D(5)$ |
| 3 |  | $B^3(9)$ | $C(4)$ |  |
| 4 |  | $B^4(12)$ |  | $D^2(10)$ |
| 5 | $A(2)$ | $B^5(15)$ | $CD(9)$ | $CD(9)$ |
| 6 | $AB(5)$ | $AB(5)$ | $C^2(8)$ | $D^3(15)$ |

⋮

VIDEO-BASED RENDERING WITH USER-CONTROLLED MOVEMENT

CROSS-REFERENCE TO RELATED APPLICATIONS

This application is a continuation-in-part of a prior application entitled "Video-Based Rendering" which was assigned Ser. No. 09/583,313 and filed May 30, 2000.

BACKGROUND

1. Technical Field

The invention is related to video techniques, and more particularly to a system and process for generating a video animation from the frames of a video sprite.

2. Background Art

A picture is worth a thousand words. And yet there are many phenomena, both natural and man-made, that are not adequately captured by a single static photo. A waterfall, a flickering flame, a swinging pendulum, a flag flapping in the breeze—each of these phenomena has an inherently dynamic quality that a single image simply cannot portray.

The obvious alternative to static photography is video. But video has its own drawbacks. For example, if it is desired to store video on a computer or some other storage device, it is necessary to use a video clip of finite duration. Hence, the video has a beginning, a middle, and an end. Thus, the video becomes a very specific embodiment of a very specific sequence in time. Although it captures the time-varying behavior of the phenomenon at hand, it lacks the "timeless" quality of the photograph. A much better alternative would be to use the computer to generate new video sequences based on the input video clip.

There are current computer graphics methods employing image-based modeling and rendering techniques, where images captured from a scene or object are used as an integral part of the rendering process. To date, however, image-based rendering techniques have mostly been applied to still scenes such as architecture. These existing methods lack the ability to generate new video from images of the scene as would be needed to realize the aforementioned dynamic quality missing from single images.

The ability to generate a new video sequence from a finite video clip parallels somewhat an effort that occurred in music synthesis a decade ago, when sample-based synthesis replaced more algorithmic approaches like frequency modulation. However, to date such techniques have not been applied to video. It is a purpose of the present invention to fill this void with a technique that has been dubbed "video-based rendering".

It is noted that in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [1, 2]. A listing of the publications corresponding to each designator can be found at the end of the Detailed Description section.

SUMMARY

The present invention is related to a new type of medium, which is in many ways intermediate between a photograph and a video. This new medium, which is referred to as a video texture, can-provide a continuous, infinitely varying stream of video images. The video texture is synthesized from a finite set of images by rearranging (and possibly blending) original frames from a source video. While individual frames of a video texture may be repeated from time to time, the video sequence as a whole should never be repeated exactly. Like a photograph, a video texture has no beginning, middle, or end. But like a video, it portrays motion explicitly. Video textures therefore occupy an interesting niche between the static and the dynamic realm. Whenever a photo is displayed on a computer screen, a video texture might be used instead to infuse the image with dynamic qualities. For example, a web page advertising a scenic destination could use a video texture of palm trees blowing in the wind rather than a static photograph. Or an actor could provide a dynamic "head shot" with continuous movement on his home page. Video textures could also find application as dynamic backdrops for scenes composited from live and synthetic elements.

Further, the basic concept of a video texture can be extended in several different ways to further increase its applicability. For backward compatibility with existing video players and web browsers, finite duration video loops can be created to play back without any visible discontinuities. The original video can be split into independently moving regions and each region can be analyzed and rendered independently. It is also possible to use computer vision techniques to separate objects from the background and represent them as video sprites, which can be rendered in arbitrary image locations. Multiple video sprites or video texture regions can be combined into a complex scene. It is also possible to put video textures under interactive control—to drive them at a high level in real time. For instance, by judiciously choosing the transitions between frames of a source video, a jogger can be made to speed up and slow down according to the position of an interactive slider. Or an existing video clip can the shortened or lengthened by removing or adding to some of the video texture in the middle.

The basic concept of the video textures and the foregoing extensions are the subject of the above-identified parent patent application entitled "Video-Based Rendering". However, the concept of video textures can be extended even further. For example, another application of the video sprite concept involves objects that move about the scene in the input video clip-such as an animal, vehicle, and person. These objects typically exhibit a generally repetitive motion, independent of their position. Thus, the object could be extracted from the frames of the input video and processed to generate a new video sequence or video sprite of that object. This video sprite would depict the object as moving in place. Further, the frames of the video sprite could be inserted into a previously derived background image (or frames of a background video) at a location dictated by a prescribed path of the object in the scene. In this regard, a user of the system could be allowed to specify the path of the object, or alternately cause a path to generated and input into the system. It is this extension of the basic video textures concept that the present invention is directed toward.

Before describing the particular embodiments of the present invention, it is useful to understand the basic concepts associated with video textures. The naive approach to the problem of generating video would be to take the input video and loop it, restarting it whenever it has reached the end. Unfortunately since the beginning and the end of the sequence almost never match, a visible motion discontinuity occurs. A simple way to avoid this problem is to search for a frame in the sequence that is similar to the last frame and to loop back to this similar frame to create a repeating single loop video. For certain continually repeating motions, like a swinging pendulum, this approach might be satisfactory. However, for other scenes containing more random motion, the viewer may be able to detect that the motion is being repeated over and over. Accordingly, it would be desirable to generate more variety than just a single loop.

The desired variety can be achieved by producing a more random rearrangement of the frames taken from the input video so that the motion in the scene does not repeat itself over and over in a single loop. Essentially, the video sequence can be thought of as a network of frames linked by transitions. The goal is to find good places to jump from one sequence of frames to another so that the motion appears as smooth as possible to the viewer. One way to accomplish this task is to compute the similarity between each pair of frames of the input video. Preferably, these similarities are characterized by costs that are indicative of how smooth the transition from one frame to another would appear to a person viewing a video containing the frames played in sequence. Further, the cost of transitioning between a particular frame and another frame is computed using the similarity between the next frame in the input video following the frame under consideration. In other words, rather than jumping to a frame that is similar to the current frame under consideration, which would result in a static segment, a jump would be made from the frame under consideration to a frame that is similar to the frame that follows the current frame in the input video. In this way, some of the original dynamics of the input video is maintained.

While the foregoing basic approach can produce acceptably "smooth" video for scenes with relatively random motions, such as a candle flame, scenes having more structured, repetitive motions may be problematic. The issue lies in the fact that at the frame level the position of an object moving in a scene in one direction might look very similar to the position of the object moving in the exact opposite direction. For example, consider a swinging pendulum. The images of the pendulum swinging from left to right look very similar to those when the pendulum is swinging from right to left. If a transition is made from a frame depicting the pendulum during its motion from left to right to one depicting the pendulum during its motion from right to left, the resulting video sequence may show the pendulum switching direction in mid-swing. Thus, the transition would not preserve the dynamics of the swinging pendulum.

The previously described process can be improved to avoid this problem and ensure the further preservation of the dynamics of the motion by considering not just the current frame but its neighboring frames as well. For example, by requiring that for a frame in the sequence to be classified as similar to some other frame, not only the frames themselves, but also their neighbors should be similar to each other. One way of accomplishing this is to modify the aforementioned computed costs between each pair of frames by adding in a portion of the cost of transitioning between corresponding neighbors surrounding the frames under consideration. For instance, the similarity value assigned to each frame pair might be a combination of the cost computed for the selected pair as well as the cost computed for the pairs of corresponding frames immediately preceding and immediately following the selected frame pair, where the cost associated with the selected pair is weighted more heavily than the neighboring pairs in the combination. In regard to the pendulum example, the neighboring frames both before and after the similar frames under consideration would be very dissimilar because the pendulum would be moving in opposite directions in these frames and so occupy different positions in the scene. Thus, the combined cost assigned to the pair would indicate a much lower similarity due to the dissimilar neighboring frame pairs. The net result is that the undesirable transitions would no longer have a low-cost associated with them. Thus, choosing just those transitions associated with a lower cost would ensure the dynamics of the motion is preserved.

So far, the described process involves determining the costs of transition based on the comparison of a current frame in the sequence (via the following frame) with all other frames. Thus, the decision on how to continue the generated sequence is made without planning ahead on how to continue the sequence in the future. This works well with one exception. It must be remembered that the input video upon which the synthesized video is based has a finite length and so there is always a last frame. At some point in the synthesis of the new video, the last frame will be reached. However, unlike all the previous frames there is no "next frame". Accordingly, a jump must be made to some previous frame. But what if there are no previous frames that would continue the sequence smoothly enough that a viewer would not notice the jump? In such a case the process has run into a "dead end", where any available transition might be visually unacceptable.

It is possible to avoid the dead end issue by improving the foregoing process to recognize that a smoother transition might have been possible from an earlier frame. The process as described so far only takes into account the cost incurred by the present transition, and not those of any future transitions. However, if the cost associated with making a particular transition were modified to account for future costs incurred by that decision, no dead end would be reached. This is because the high cost associated with the transition at the dead end would be reflected in the cost of the transition which would ultimately lead to it. If the future costs associated with making a transition are great enough the transition would no longer be attractive and an alternate, less "costly" path would be taken. One way of accomplishing the task of accounting for the future transition costs is to sum the previously described cost values with a cost factor based on the total expected cost of the future sequence generated if a certain transition decision is made. To arrive at a stable expression of costs, the future costs would be discounted.

The foregoing analysis results in a cost being assigned to potential transitions between frames of the input video. During the synthesis of the desired new video sequence, the basic idea will be to choose only those transitions from frame to frame that are acceptable. Ideally, these acceptable transitions are those that will appear smooth to the viewer. However, even in cases where there is no choice that will produce an unnoticeable transition, it is still desirable to identify the best transitions possible. Certain techniques can be employed to smooth out these rough transitions as will be explained later.

In regard to the synthesis of a continuous, non-looping video sequence, a way of accomplishing the foregoing goals is to map the previously computed transition costs to probabilities through a monotonically decreasing function to characterize the costs via a probability distribution. The probability distribution is employed to identify the potentially acceptable transitions between frames of the input video clip. Prior to actually selecting the order of the frames of the input video that are to be played in a synthesizing process, the number of potentially acceptable transitions that there are to choose from can be pruned to eliminate those that are less desirable and to reduce the processing workload. One possible pruning procedure involves selecting only those transitions associated with local maxima in the probability matrix for a given source and/or destination frame as potentially acceptable transitions. Another pruning strategy involves setting to zero all probabilities below a prescribed minimum probability threshold. It is noted that these two strategies can also be combined by first selecting the transitions associated with the local probability maxima and then setting the probabilities associated with any of the selected transitions that fall below the minimum probability threshold to zero.

Once the frames of the input video clip have been analyzed and a set of acceptable transitions identified, these transitions are used to synthesize the aforementioned continuous, non-looping video sequence. Essentially, synthesizing the video sequence entails specifying an order in which the frames of the input video clip are to be played. More particularly, synthesizing a continuous, non-looping video sequence involves first specifying a starting frame. The starting frame can be any frame of the input video sequence that comes before the frame of the sequence associated with the last non-zero-probability transition. The next frame is then chosen by selecting a frame previously identified as having a potentially acceptable transition between the immediately preceding frame (which in this first instance is the starting frame) and the remaining selected frames. If there is more than one qualifying frame, then one of them is selected at random, according to the previously computed probability distribution. This process is then repeated for as long as the video is running.

The next phase in the generation of a new video sequence from the frames of the input video clip involves rendering the synthesized video. In regards to the continuous, non-looping video sequence, the new video is rendered by playing the frames of the input video clip in the order specified in the synthesizing process. As the generated video is continuous, the synthesizing process can be on-going with the rendering process. This is possible because the synthesizing process can specify frames to be played faster than they can be played in the rendering process.

Although the foregoing process is tailored to identify low cost transitions, and so introduce only small, ideally unnoticeable, discontinuities in the motion, as indicated previously there may be cases where such transitions are not available in the frames of the input video clip. In cases where transitions having costs that will produce noticeable jumps in the synthesized video must be employed, techniques can be applied in the rendering process to disguise the transition discontinuities and make them less noticeable to the viewer. One of the smoothing techniques that could be employed is a conventional blending procedure. This would entail blending the images of the sequence before and after the transition to produce a smoother transition. Preferably, the second sequence would be gradually blended into the first, while both sequences are running using a crossfading procedure. Another smoothing technique that could be employed would be to warp the images towards each other. This technique would prevent the ghosting associated with the crossfade procedure as common features of the images are aligned.

While the foregoing description involves analyzing the frames of the input video clip as a single unit, this need not be the case. For example, the frames of the input video clip could be advantageously segmented prior to analysis where the video includes a object that is of interest, but where the rest of the scene is not. The object of interest could be extracted from each frame and a new video sequence of just the object generated using the previously-described processes. It is noted that a video generated in this way is referred to a video sprite. One use for a video sprite is to insert it into an existing video. This would be accomplished by inserting the frames of the video sprite into the frames of the existing video in corresponding order. The frames of the video sprite would be inserted into the same location of each frame of the existing video. The result would be a new video that includes the object associated with the video sprite.

As mentioned previously, an object could be extracted from the frames of the input video and processed in accordance with the present invention to generate a new video sequence or video sprite of that object. In addition, the translation velocity of the object for each frame would be computed and associated with each frame of the video sprite. The portion of previously-described analysis involving computing a transition cost between the frames of the input video clip could be modified to add a cost factor based on the difference in velocity of the object between the frames involved. This would tend to influence the selection of acceptable transitions to ensure a smooth translation motion is imparted to the rendered video. The rendering process itself would also be modified to include an additional procedure for inserting the extracted regions depicting the object (i.e. the frames of the video sprite) into a previously derived background image, or a frame of a background video, in the order specified by the synthesis procedure. Each video sprite frame is inserted at a location dictated by a prescribed path of the object in the scene and the velocity associated with the object in the selected video sprite frame. This can be done by making the centroid of the inserted extracted region correspond with a desired path point. Thus, the generated video, which is referred to as a video animation, would show the object moving naturally about the scene along the prescribed path. This path could mimic that of the object in the input video clip, or it could be prescribed by a user.

With regard to the option of a user prescribing the path, one embodiment of the present video based rendering system and process would involve the user specifying successive points along a desired path through a background scene. For example, the user could select points in a background image, or a frame of a background video, displayed on a computer monitor. This could be done on a point-by-point basis, or the user could move a cursor along a desired path that the object of interest is to take in the new video animation. In the latter case, points along the traced path would preferably be recorded and used to define the path. Frames of the video sprite showing the object of interest would be selected and inserted in a background image or frame along the user-specified path. As with the previous embodiment, the velocity of the object in the selected frames would be taken into consideration.

More specifically, the so-called user-controlled movement embodiment involving a user-specified path can be implemented as follows. First, a video sprite of an object it is desired to feature in the video animation is input into the system, along with a user-specified path. Next, one of the frames of the video sprite is selected as the first frame, and inserted into a frame of an existing video sequence at a point on the user-specified path, to produce the first frame of the video animation. The existing video sequence can simply be multiple copies of the same background image, or a frame of a background video which changes over time. The previously-selected frame of the video sprite is then compared to the other video sprite frames to identify potentially acceptable transitions between the selected frame and the other frames, and a video sprite frame that was identified as corresponding to an acceptable transition from the last-selected frame is selected. This frame is designated as the currently selected video sprite frame in lieu of the last-selected frame. The new currently-selected frame is then inserted into the next consecutive frame of the aforementioned existing video sequence at a point along the user-specified path dictated by the velocity associated with the object in the last-inserted frame. The result of the insertion action is the creation of the next frame of the animated video. The currently-selected frame of the video sprite is next compared to the other video sprite frames to identify potentially acceptable transitions between it and the other frames, just as was done with the first video sprite frame. The foregoing process of selecting, inserting and comparing video sprite frames to create successive frames of the video animation continues for as long as it is desired to produce new frames of the video animation.

The above-described process actions involving comparing a selected video sprite frame with all the other video sprite frames to identify acceptable transitions therebetween is preferably accomplished as follows. First, the translation velocity associated with the object for each of the frames of the video sprite is computed. These velocities are used to compute a velocity cost indicative of the difference in the object's velocity between the currently selected frame (which may be the first frame) and each of the other video sprite frames. In addition, an image similarity cost associated with transitioning from the selected frame to each of the other frames is computed. Next, an error cost related to the user-specified path is computed between the selected video sprite frame and each of the other frames. This error cost is a function of the distance between the next recorded point in the user-specified path and the current position of the object in the path, as well as the velocity of the particular "other" frame under consideration. An anticipated future transition cost representative of the transition costs that would be incurred if the transition between the selected video sprite frame and each of the other frames were implemented is also respectively computed for each of the other frames. The velocity cost, image similarity cost, error cost and future transition- cost are added together to produce a directed future cost for the transition between the selected video sprite frame and each of the other video sprite frames. These directed future costs are then mapped to probability values using a monotonically decreasing function to produce a probability distribution for the costs. And finally, those video sprite frames that are associated with a transition having a probability maximum between the selected video sprite frame and the other video sprite frames are designated as corresponding to an acceptable transition.

It is noted that the foregoing user-controlled motion video rendering system and process can also be implemented without the path being directly specified by a user. Rather, the path could be generated in other ways and input into the present system.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 6A and 6B are images respectively depicting the beginning and end frame from a video clip of a swinging clock pendulum where a person's hands moves into the field of view in the end frame.

FIGS. 7A through 7C are images respectively representing the cost matrix ($D'_{ij}$) and probability matrix ($P'_{ij}$) for a clock pendulum sequence with a dead end, and the same probability matrix after future costs are considered.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

This invention is related to a system and process for synthesizing a continuous video of a scene from a sampling of actual video images of the scene. This synthesis is possible whenever motion in a real-world scene exhibits some repetitive pattern. Such repetitive patterns are quite common. For example, a waving flag, balloons blowing in the wind, a flickering flame, a person or animal running/walking, birds flying, or fish swimming are just a few of the many motions that exhibit some degree of repetitiveness. It would be very useful to synthesize continuous video sequences of such scenes for example as use as screen savers or "living photographs" where the subject and background scene move. Likewise, it would be very useful to synthesize fixed length videos of such scenes where the length is entirely selectable by a user. It would also sometimes be useful to be able to shorten or lengthen an existing piece of video footage.

Figure 1:
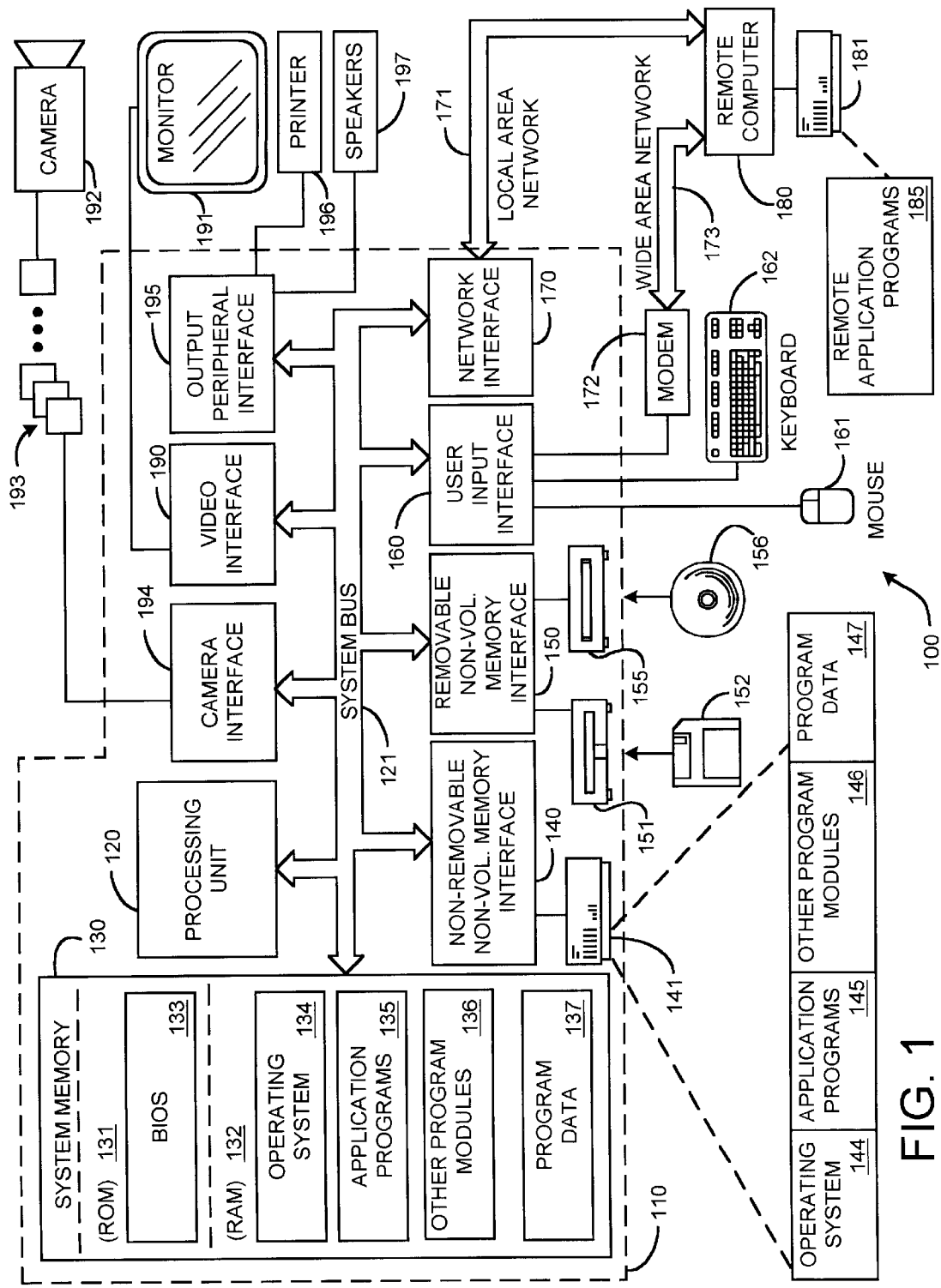
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
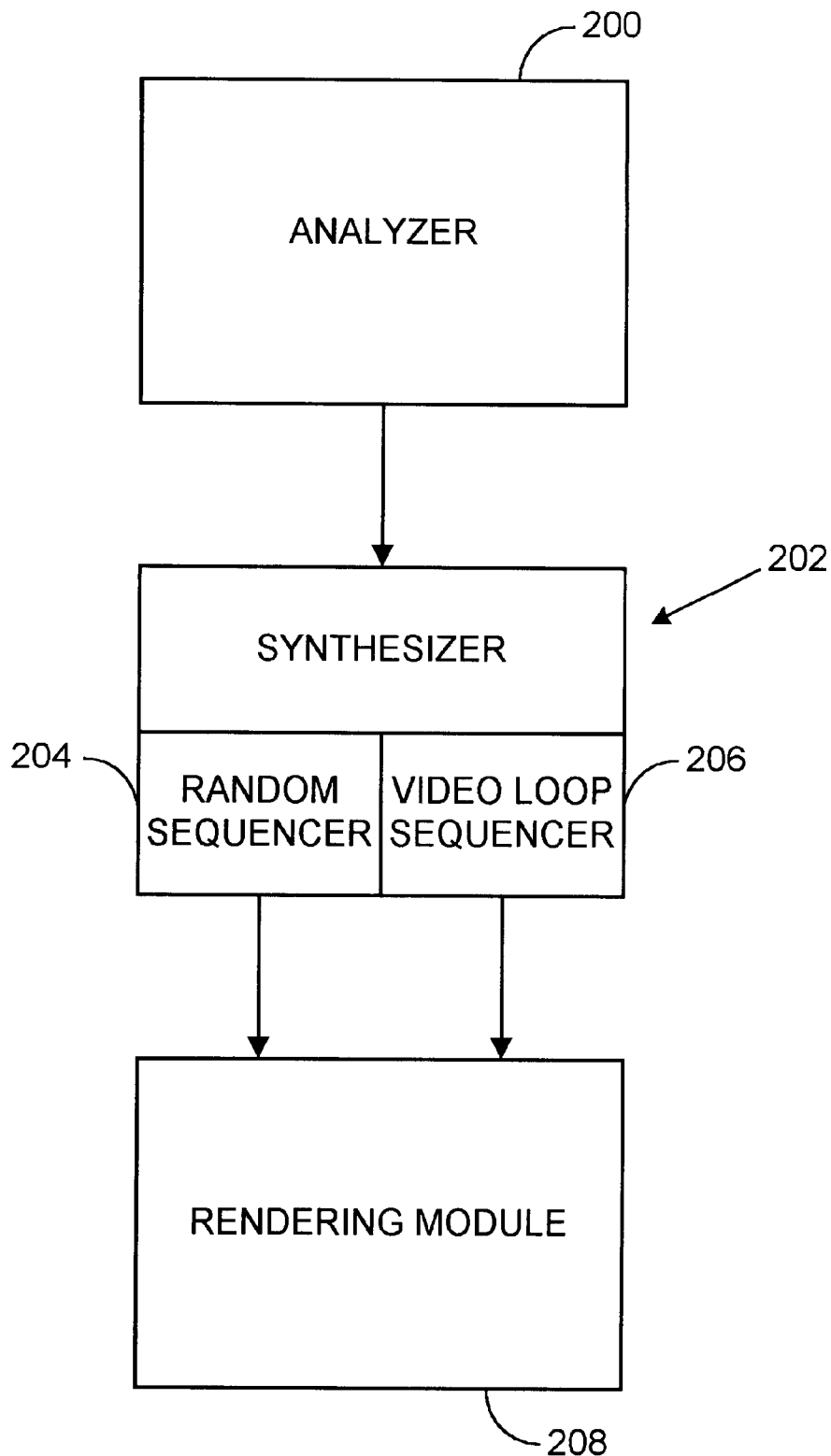
FIG. 2 is a block diagram showing the high-level system modules for generating a new video sequence from the frames of a finite-length video clip.

The exemplary operating environment having now been discussed, the remaining part of this description section will be devoted to a description of the program modules embodying the aforementioned video-based rendering system and process according to the present invention. The video-based rendering system is generally organized into three major modules, as shown in FIG. 2. The first module of the system is an analyzer 200 that is used to analyze the input video to find good transition points (i.e., places to jump), and store these in a small data table that becomes part of what will be referred to as a video texture representation. The analyzer 200 may also optionally trim away parts of the input video that are not needed, or segment the original video into independently moving pieces, in order to more easily analyze (and find the repetition) in these individual components.

The second module of the system is a synthesizer 202 that synthesizes new video from the analyzed video clip. This synthesizer 202 can include two sub-modules. The first sub-module, which will be referred to as a random sequencer 204, employs the transition information generated by the analyzer 200 to sequence a continuous video i.e., to decide in what order to play (or shuffle) the original video frames, or pieces thereof. This can be accomplished using a Monte-Carlo (stochastic) technique that randomly decides which frame should be played after a given frame using the table of frame-to-frame similarities computed by the analyzer 200. The second sub-module, which will be referred to as a video loop sequencer 206, employs the transition information generated by the analyzer 200 to sequence a small number of transitions ordered in such a way that the video is guaranteed to loop after a user-specified number of frames. This latter sub-module can be used to generate a video loop that can be played by a conventional video player in "loop mode".

Once the set of frames to be played has been-selected, the rendering module 208 puts together the frames (or frame pieces) in a way that is visually pleasing. This may be as simple as just displaying or outputting the original video frames, as dictated by the synthesizer 202, or it may involve cross-fading or morphing across transitions, and/or blending together independently moving regions.

It is noted that the analyzer 200 and the rendering module 208 need not be physically located within the same device or be present in the same location. Rather, video clips can be analyzed in advance and the necessary information provided to the rendering module 208 at any time and place for the purpose of generating a new video sequence. As for the synthesizer 202, this module can reside with the analyzer, in which case the sequencing information generated by the synthesizer 202 would be provided to the rendering module 208. However, the synthesizer 202 could also be located with the rendering module, in which case the transition information generated by the analyzer 200 would be provided to the combined synthesizer 202 and rendering module 208.

Figure 3:
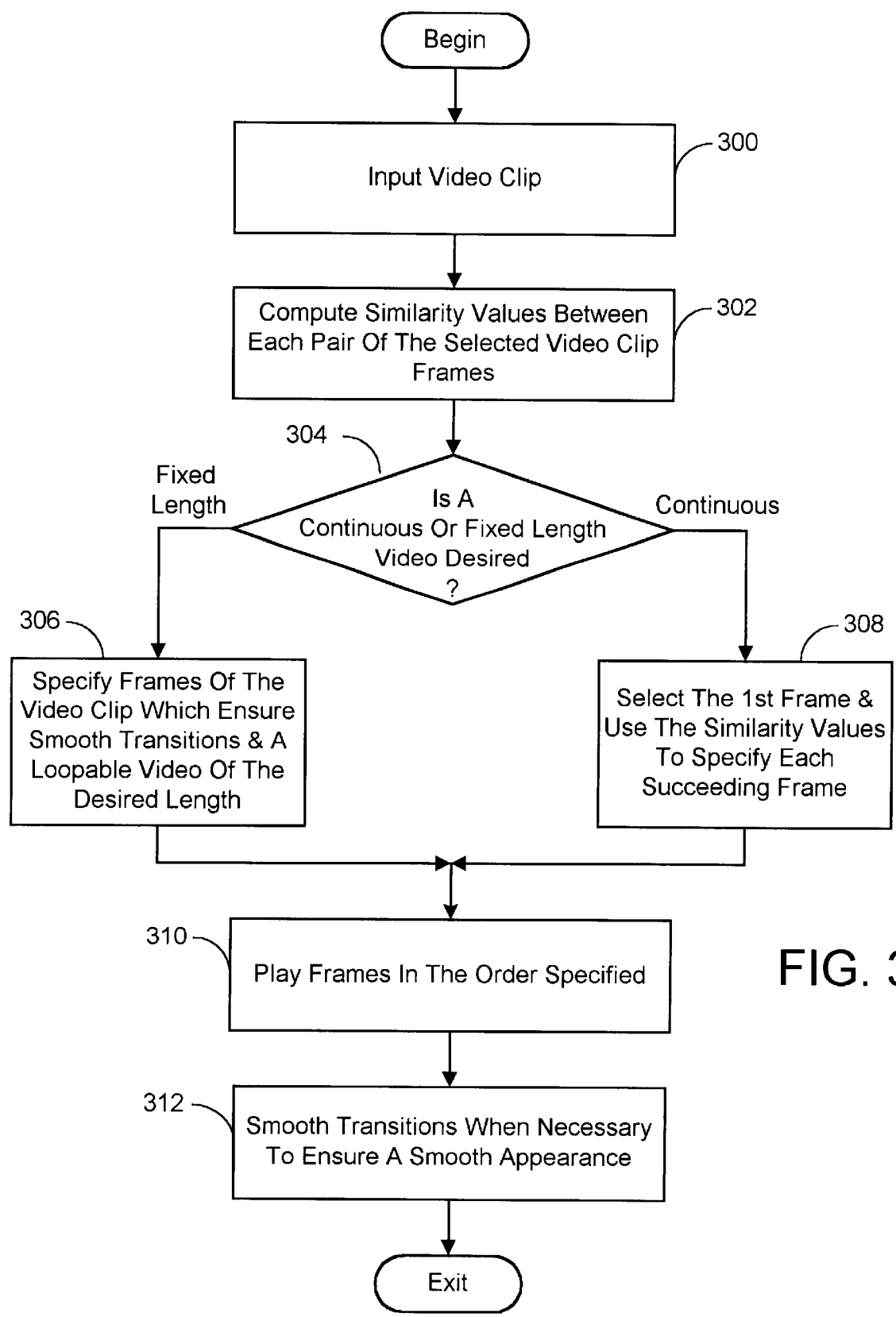
FIG. 3 is a flow chart diagramming an overall process for generating a new video sequence from the frames of a finite-length video clip.

The process of generating a new video sequence from a video clip of an actual scene exploits the repetitiveness of the scene. The new video sequences are generated by essentially rearranging and duplicating the frames of the video clip. It is noted that the video clip need not be one continuous video sequence. Rather, the video clip could be made up of multiple sequences of the scene captured at different times. Regardless of how many video sequences make up the inputted video clip, the trick is to produce the aforementioned new sequences such that the motion appears smooth and seamless to the viewer. Referring to FIG. 3, the video-based rendering process generally involves first inputting the video sequence or sequences constituting the aforementioned video clip (process action 300). Then, a value indicative of the similarity between each pair of a selected number of frames of the video clip (or portions thereof is computed, as indicated by process action 302. The similarity value is preferably characterized by a cost associated with transitioning or jumping from one frame to another, and is indicative of how smooth the transition would appear to a person viewing a video. These costs will be used to synthesize a new video from the frames of the inputted video clip. As will be discussed in greater detail later, the measure of the similarity between a frame under consideration and all others is actually based not on the frame under consideration itself, but upon the similarity of its successor frame in the input video sequence and the other frames. It is next decided if the new video will be continuous, or have a fixed length (process action 304). If the new video is to have a fixed length, then the frames of the input video are sequenced to ensure a smooth transition between each frame and to produce a "loopable" video of the desired length (process action 306). The fixed length sequence is loopable in that it jumps from its last frame back to its first frame to allow continuous playback. The sequencing procedure is also preferably tailored to produce a loopable fixed length video having the lowest total transition cost to ensure it appears smooth to a viewer. However, if the new video is to be a continuous video, the frames of the input video are sequenced by selecting a first frame and then using the similarity values to select each succeeding frame indefinitely (process action 308). The selection of succeeding frames essentially entails selecting a frame having an acceptably low cost assigned to the transition between it and the previous frame. When several such frames exist, the previously computed probabilities are used to choose among these possibilities, i.e., frames (transitions) with higher probabilities are chosen more often. Once the sequencing is complete, the video-based rendering process proceeds onto a rendering phase. The rendering phase generally entails playing the frames of the input video in the order specified in the sequencing procedure (process action 310). This playback may be repeated in the case of a fixed length video sequence, as desired. The rendering phase may also include procedures for smoothing the transition between frames where an acceptably low cost transition was unavailable in the input video clip (process action 312).

The remainder of this description details the representation used to capture the structure of aforementioned video texture representation and the process for extracting this representation from source video (Section 1), and for finding and sequencing the transitions needed to produce either a continuous video sequence or a loopable, fixed-length video sequence (Section 2). The rendering process used to composite video sprites together and to smooth over visual discontinuities is then described in Section 3. And finally, a description of some further extensions to the video-based rendering process is provided in Section 4. These extensions include the extraction and rendering of video sprites, changing viewpoints using image-based rendering techniques, and the creation of video-based animation, which is the subject of the present invention.

1. Analysis: Extracting Video Textures From Video

The first step in creating a video texture from an input video sequence is to compute some measure of similarity between all pairs of frames in the input sequence. In tested embodiments of the present invention, a least squares ($L_2$) distance metric was used to characterize the similarities as costs. However, if the computation of the $L_2$ distance metric is too computationally costly, the distance between the highest energy wavelet coefficients of every frame can be used instead as an approximation [1]. Additionally, this or some other fast image querying metric could be used to discard many dissimilar pairs of images and compute the full $L_2$ metric only on the remaining candidates.

Before computing these distances, the brightness in the image sequence is preferably equalized in order to remove visual discontinuities that would otherwise appear when jumping between different parts of the input video. This can be accomplished using conventional equalization methods. In addition, if the camera has a small amount of jitter (e.g., from being handheld or shot in high wind conditions), conventional video stabilization techniques can be employed [2] prior to creating the video textures.

Once the frame-to-frame distances have been computed, they are stored in the matrix:

$$D_{ij}=\|I_i-I_j\|_2 \qquad (1)$$

which denotes the distance (i.e., cost) between each pair of images $I_i$ and $I_j$. During the new video synthesis, the basic idea will be to create transitions from frame i to frame j anytime the successor of i is similar to j—that is, whenever $D_{i+1,j}$ is small.

A simple way to do this is to map these costs to probabilities through some monotonically decreasing function. For example, an exponential function could be used, $$P_{ij} \sim e^{-\frac{D_{(i+1)j}{}^p}{\sigma^p}}, \qquad (2)$$

All the probabilities for a given row of P are normalized so that $$\sum_j P_{ij}=1.$$

At run time, the next frame to display after frame i is selected according to the distribution of $P_{ij}$. The a and p parameters control the mapping between the cost and the relative probability of taking a given transition. Smaller values of σ emphasize just the very best transitions, while higher values of a allow for greater variety at the cost of poorer transitions. The p term controls how severe high cost transitions are compared to low cost transitions. In most cases, it is preferred that p=2 and σ be set to a small multiple of the average (non-zero) $D_{ij}$ values, so that the likelihood of jumping at a given frame is fairly low.

Two alternate (and equivalent) representations can be employed to store the video texture representations. One is as a matrix of probabilities (or costs), in which each element of the matrix describes the probability of transitioning from frame i to frame j. The other is as a set of explicit links from one frame i to another j, along with their associated probabilities (or costs). The first representation is advantageous when the matrix is dense, as the indices do not need to be stored explicitly. However, in most cases the set of allowable transitions is relatively sparse, and so the second representation is preferred.

In addition, as will be discussed later, in many cases better results can be achieved by splitting the original video into regions and computing a video texture for each region separately. The video is also sometimes segmented into different video sprite elements, and a video texture is computed for each sprite separately. In both these cases, additional information applicable to the regions and elements can be stored along with the links. For example, in the case of video sprites, additional information concerning how the relative position of the sprite is changed as the link is crossed can be stored along with the link data.

1.1 Preserving Dynamics

Figure 4:
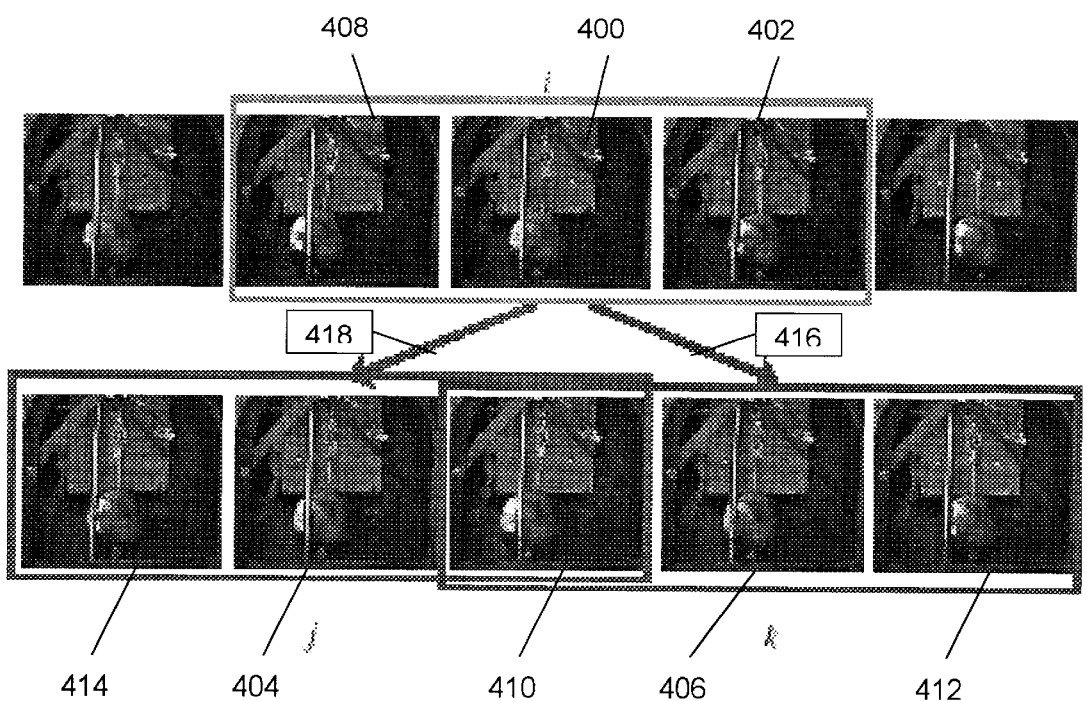
FIG. 4 provides a series of image frames from a video clip depicting a swinging clock pendulum.
Figures 5A, 5B, 5C, 5D:
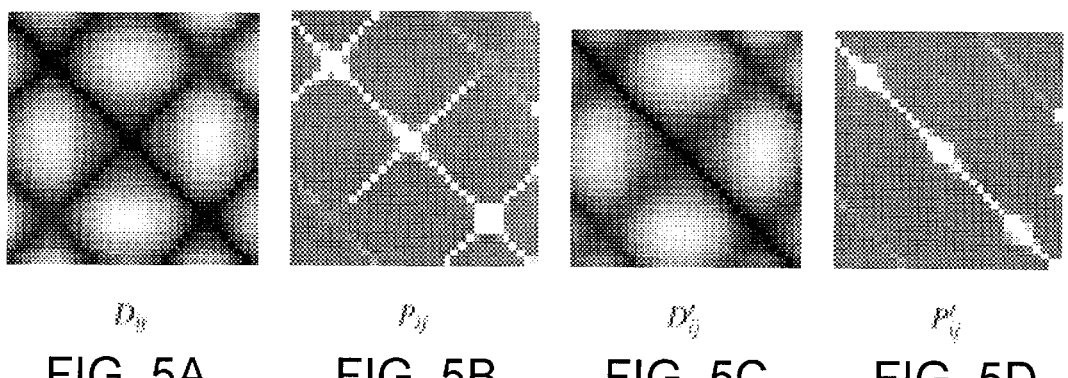
FIGS. 5A through 5D are images respectively representing an unfiltered cost matrix ($D_{ij}$), an unfiltered probability matrix ($P_{ij}$), a filtered cost matrix ($D'_{ij}$) and a filtered probability matrix ($P'_{ij}$), all associated with the clock pendulum sequence of FIG. 4.

Of course, video textures need to preserve more than just similarity across frames: the dynamics of motion need to be preserved as well. Consider, for example, a swinging pendulum (FIG. 4). Each frame of the left-to-right swing will have a corresponding frame in the right-to-left swing that looks very similar. However, transitioning from frame 400 in the left-to-right swing to a frame that looks very similar to 402 in the right-to-left swing will create an abrupt and unacceptable change in the pendulum's motion.

One possible way to overcome this problem might be to match velocities using an optical flow computed at each frame in addition to the visual similarity between frames. However, flow computations can be quite brittle as they can be almost arbitrary in the absence of texture. Accordingly, an alternate approach is preferred. This alternate approach solves the problem of preserving dynamics by requiring that for a frame to be classified as similar to some other frame, not only the frames themselves, but also their neighbors within some weighted window must be similar to each other. In other words, subsequences are matched, instead of individual frames. This is indicated by the boxes in FIG. 2. Frame 400 in the top row matches both frames 404 and 406 of the bottom row very closely. However, of these two possibilities, only frame 406 comes from a sequence with the correct dynamics. The two possibilities are disambiguated by considering the sequence of frames 400, 404, and 406. For example, in FIG. 4 frames 408, 400, and 402 match 410, 406, and 412, but not 414, 404, and 410. Thus, the arrow 416 on the right indicates a good match that preserves the direction of motion, while the arrow 418 on the left indicates an undesirable match.

The foregoing subsequence matching can be achieved by filtering the difference matrix with a diagonal kernel with weights $[w_{-m}, \ldots, w_{m-1}]$:

$$D'_{ij} = \sum_{k=-m}^{m-1} w_k D_{i+k, j+k} \tag{3}$$

In tested embodiments of this procedure, m=1 or 2, corresponding to a 2- or 4-tap filter with binomial weights was employed. Making the filter even-length removes the intrinsic asymmetry between source and destination frames, i.e., deciding whether to jump from i to j is determined by the similarity between frames i+1 and j. After filtering and computing the probabilities from the filtered difference matrix, the undesired transitions no longer have high probability.

FIGS. 5A through 5D show this behavior using two-dimensional images of the $D_{ij}$ and $P_{ij}$ tables for the pendulum sequence of FIG. 4. Here, the new probabilities $P'_{ij}$ are computed from the dynamics-preserving distances $D'_{ij}$ in the same way as the probabilities $P_{ij}$ were computed from $D_{ij}$ (i.e., via Equation (2)). In the original unfiltered tables, the periodic nature of the pendulum is readily visible, as is the tendency to match both forward and backward swings. After filtering, only swings in the same direction are matched. (The bright knots are where the pendulum pauses at the ends of its swing, and hence has more self-similarity.)

1.2 Avoiding Dead Ends And Anticipating The Future

The decision rule described so far looks only at the local cost of taking a given transition. It tries to match the appearance and dynamics in the two frames, but gives no consideration to whether the transition might, for example, lead to some portion of the video from which there is no graceful exit—a "dead end," in effect. For example, referring to FIGS. 6A and 6B, the beginning frame (FIG. 6A) and the end frame (FIG. 6B) from a video clip of a swinging clock pendulum are shown. Assume the hands of a person suddenly come into view in the last frame of the video clip as shown in FIG. 6B. This being the case there will be no prior frame to which a jump can be made from the last frame without creating a visual discontinuity—namely disappearing hands. Better results can be achieved by planning ahead. One way of planning ahead would be to predict the anticipated, discounted future cost of choosing a particular transition, given the future transitions that such a move might necessitate.

More precisely, let $F_{ij}$ be the anticipated future cost of a transition from frame i to frame j, i.e., a cost that reflects the expected average cost of future transitions. $F_{ij}$ is defined by summing over all future anticipated costs:

$$F_{ij} = D'_{i+1, j} + \alpha \sum_k P_{jk} F_{jk} \tag{4}$$

Here, $\alpha$ is a constant that controls the relative weight of future transitions in the metric. For convergence, $\alpha$ is chosen to be between 0 and 1 (in tested embodiments $\alpha$ was chosen to be 0.999). The probabilities $P_{jk}$ are defined as before (i.e., via Eq. (2)), but using $F_{ij}$ instead of $D'_{i+1j}$, $$P_{ij} \sim e^{-\frac{F^p_{ij}}{\sigma^p}} \tag{5}$$

(note the change of subscript values, which is made to more directly reason about transition costs, instead of frame similarities).

Equations (4) and (5) can be solved using a simple iterative algorithm, i.e., by alternating their evaluation. Unfortunately, this algorithm is slow to converge.

A faster variant on Eq. (4) can be derived by making the following observation. As $\sigma \to 0$, the $P_{jk}$ in Eq. (4) will tend toward a value of 1 for the best transition, and 0 otherwise. We can therefore replace this equation with:

$$F_{ij} = D'_{i+1, j} + \alpha \min_k F_{jk} \tag{6}$$

This new equation corresponds to finding the best possible continuation (path) through a graph with associated costs on edges, and is known to have good convergence properties.

The computational efficiency of the algorithm can be increased further by being selective about which rows in $F_{ij}$ are updated at each step. Heuristically the lowest cost path often involves a jump close to the end of the sequence, and the cost of this jump has to be propagated forward. Thus, $F_{ij}=D'_{i+1j}$ is used to initialize the algorithm and $$m_j = \min_k F_{jk} \quad (7)$$

Iterating from the last row to the first, $F_{ij}$ is computed by alternating between solving:

$$F_{ij}=D'_{ij}+\alpha m_j \quad (8)$$

and updating the corresponding $m_j$ entries using Eq. (7). These sweeps are repeated from back to front until the matrix entries stabilize.

FIGS. 7A through 7C show the cost matrix and probability matrices for a clock sequence with a dead end, both before and after applying the future cost computation. Note that the cost matrix (FIG. 7A) is heavily contaminated on the right and bottom edges. The original probability matrix (FIG. 7B) would cause a video player to run to the end and get stuck. The new matrix (FIG. 7C) based on future costs would however cause the system to "jump out" early, before getting stuck in the dead end.

1.3 Pruning The Transitions

The above-described techniques can be used to produce perfectly good video textures. However, it is often desirable to prune the set of acceptable transitions, both to save on storage space, and to improve the quality of the resulting video (by suppressing non-optimal jumps).

While any appropriate pruning criteria could be employed, two such paradigms are of particular interest. The first involves selecting only those transitions associated with local maxima in the probability matrix for a given source and/or destination frame as potentially acceptable transitions. This first strategy finds just the "sweet spots" in the matrix of possible transitions between frames, since often a whole neighborhood of frames has good and very similar transitions to some other neighborhood of frames, and only the best such transition needs to be kept. The other pruning strategy involves setting all probabilities below a prescribed minimum probability threshold to zero. It is noted that these two strategies can also be combined by first selecting the transitions associated with the local probability maxima and then setting the probabilities associated with any of the selected transitions that fall below the minimum probability threshold to zero. In addition, it is noted that the preferred approach is to apply these pruning strategies after computing the probability matrix using future costs via Eq. (5).

It is noted that a different pruning strategy is preferred if video loops are to be produced, as will be discussed in the next section.

2. Synthesizing New Video From An Analyzed Video Clip

Once the analysis stage has identified good transitions for the video texture, it is next decided what order to play the video frames. For this synthesis stage, two separate schemes have been devised: continuous video and video loops.

2.2 Continuous Video

Figure 8:
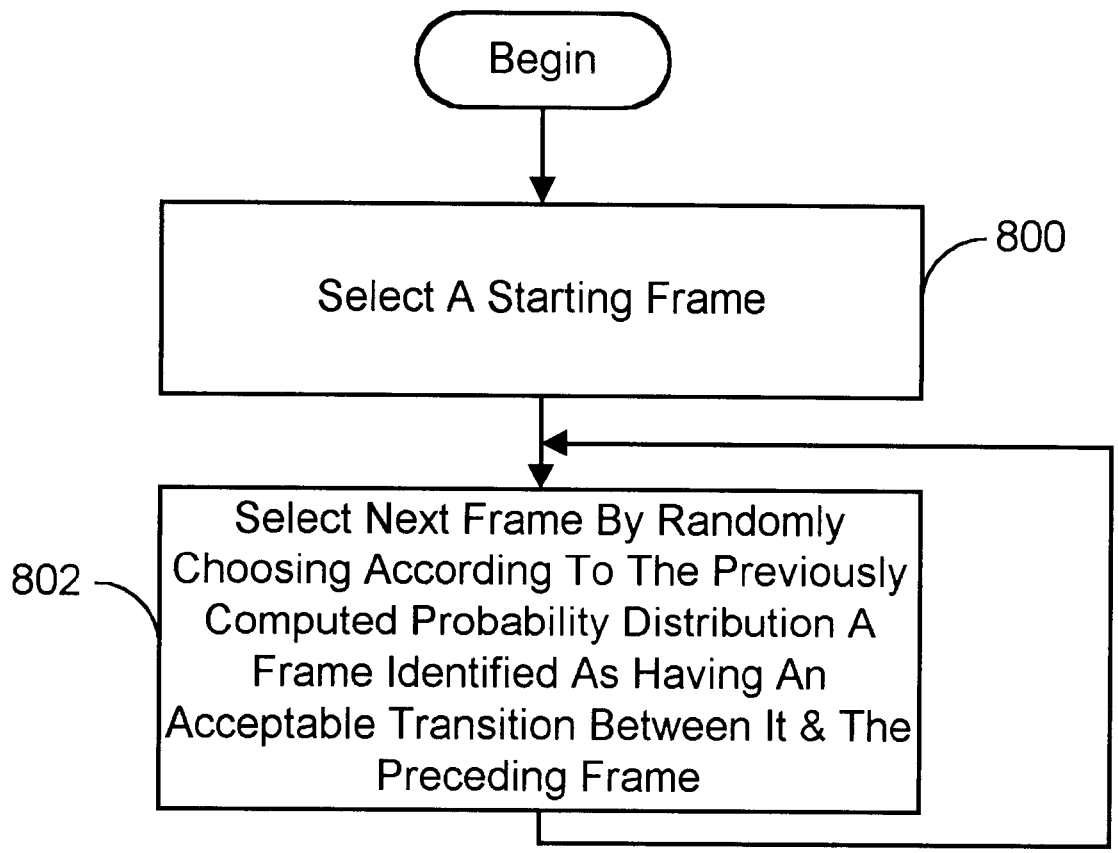
FIG. 8 is a flow chart diagramming a process for specifying the frames of a continuous, non-looping video sequence in accordance with the synthesizing module of the overall process of FIG. 3.

Referring to FIG. 8, synthesizing a new continuous video from an analyzed video clip involves first selecting a starting frame (process action 800). The starting frame can be any frame of the input video sequence that comes before the frame of the sequence associated with the last non-zero-probability transition. The next frame is then chosen by selecting a frame previously identified as having a potentially acceptable transition between the immediately preceding frame (which in this first instance is the starting frame) and the remaining selected frames (process action 802). If there is more than one qualifying frame, then one of them is selected at random, according to the previously computed probability distribution $P_{ij}$. It is noted that usually, $P_{i,i+1}$ is the largest probability, since $D'_{ij}=0$ (however, this is not necessarily true when using $F_{ij}$, which is how the system avoids dead ends). This simple Monte-Carlo approach creates video textures that never repeat exactly and is useful in situations in which the video texture can be created on the fly from the source material. All succeeding frames are then chosen in the same way by repeating process action 802 indefinitely to synthesize the desired continuous video sequence.

2.3 Video Loops

When a conventional digital video player is used to show video textures, it is necessary to create video loops that do in fact repeat with a fixed period. In this case the video texture can be played in standard "loop mode" by such a player. Synthesizing these fixed length, loopable video sequences from an analyzed video clip is somewhat more involved than continuous video. Generally, the process entails selecting a small number of jumps that are guaranteed to be playable (traversable) in an order that produces a video loop, i.e., a fixed-length video clip that has a smooth transition from the last frame to the first. This is somewhat analogous to turning real audio clips into samples that can be played by a synthesizer. Preferably the video loop synthesis procedure would find the best video loop (i.e., lowest total cost) of a given length, or within some range of lengths.

Before describing the procedure, some nomenclature must be established. Transitions going from a source frame i to a destination frame j=i+1 are continuations, and all other transitions real transitions. If only a single real transition is used to generate a cyclic sequence, it has to be a transition (i,j) where i≧j, which means that it jumps backwards. The generated subsequence runs to the end and jumps back to the beginning. Such a cyclic sequence is called a primitive loop with a range of [j, i]. The cost of such a loop is the filtered distance between the two frames $D'_{ij}$.

One or more primitive loops can be combined to create cyclic additional sequences, called compound loops. To add a (primitive or compound) loop to another loop, their ranges have to overlap. Otherwise there is no way to run the first compound loop after the second has played. The resulting compound loop has a range that is the union of ranges of the two original loops, and a length and cost that is the sum of the original lengths and costs. Compound loops may contain repeated instances of the same primitive loop, and can thus be represented by a multiset, where the ordering of the loops is not important.

Figure 9:
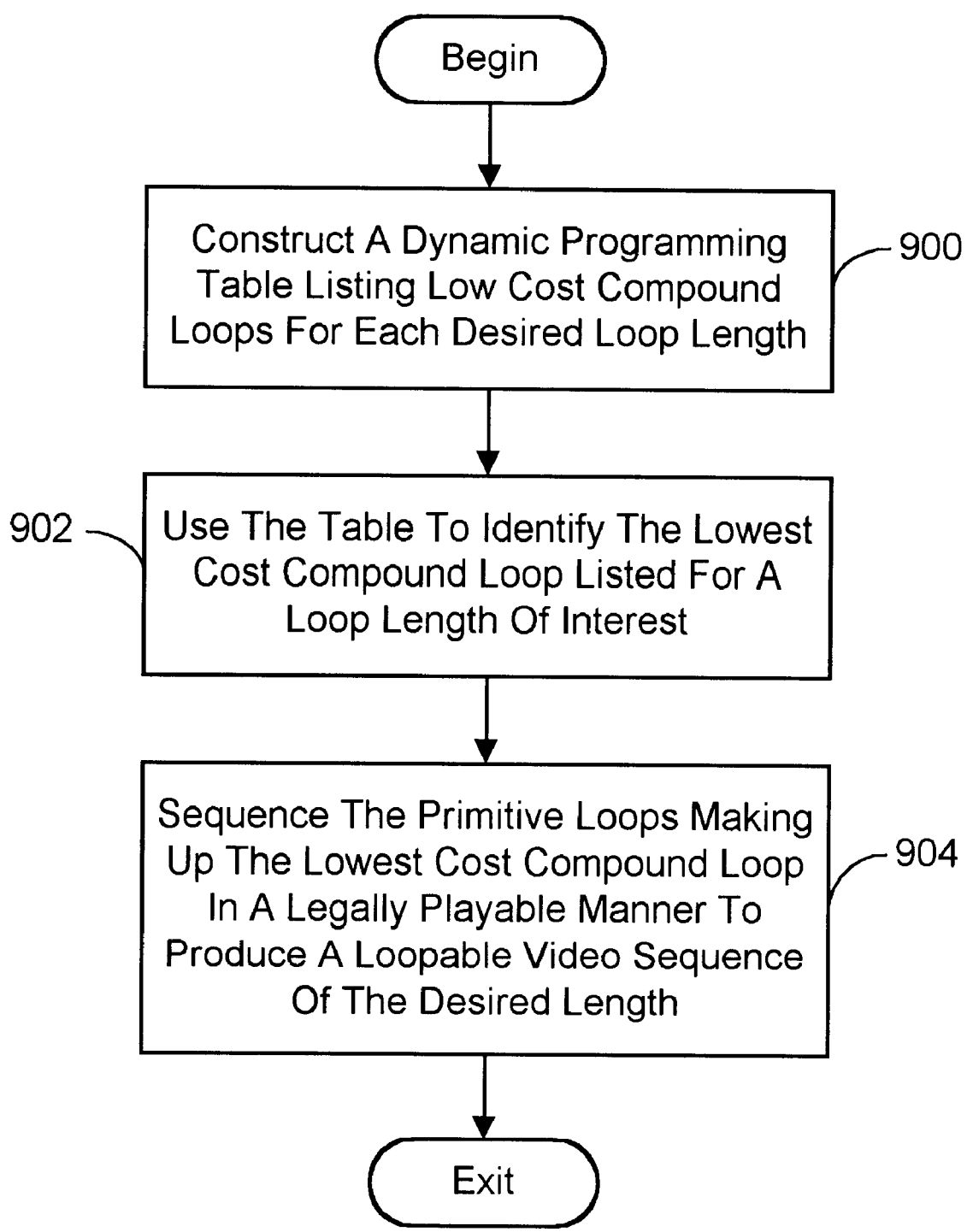
FIG. 9 is a flow chart diagramming a process for specifying the frames of a loopable, fixed length video sequence in accordance with the synthesizing module of the overall process of FIG. 3.

Referring to FIG. 9, a suitable set of primitive loops whose ranges overlap and which sum to the desired length of the compound loop can be found as follows. First, in process action 900, a dynamic programming table is constructed which lists low cost compound loops for each of a set of given loop lengths that contains at least one instance of a particular primitive loop, for each primitive loop of interest. The table can be used to find the compound loop exhibiting the lowest cost among those listed for a particular loop length (process action 902). The primitive loops making up the lowest cost compound loop are then sequenced into a legally playable order using of a so-called scheduling of loops process. This method essentially entails finding the ordering of the primitive loops that produces overlap ranges and which sum to the desired length of the compound loop that is to form the loopable fixed length sequence (process action 904). The remainder of this section will provide a more detailed description of the program modules needed to generate video loops by the foregoing process.

In the next two sections the two procedures used to produce optimal video loops will be presented—that is, video loops with minimal cost for a given sequence length. The first procedure selects a set of transitions that will be used to construct the video loop. The second procedure then orders these transitions in a legal fashion—that is, in an order that can be played without any additional transitions.

2.3.1 Selecting The Set Of Transitions

The most straightforward way to find the best compound loop of a given length L is to enumerate all multisets of transitions of total length L, to select the legal ones (i.e., the compound loops whose ranges form a continuous set), and to keep the lowest cost one. Unfortunately, this process is exponential in the number of primitive loops or transitions considered.

Instead, a dynamic programming algorithm is employed. Unfortunately, the simplest such approach, i.e., that of building up larger optimal loops from smaller ones, does not work because it is quite possible that the optimal loop of length L is composed of other loops that were not optimal for their own lengths. This occurs because pairs of loops can only be combined when their ranges overlap. Generally, a range of lengths can be examined by building up the table described below, and then finding the compound loop with the desired property (preferably the lowest total cost) within that range.

Figures 10, 13:
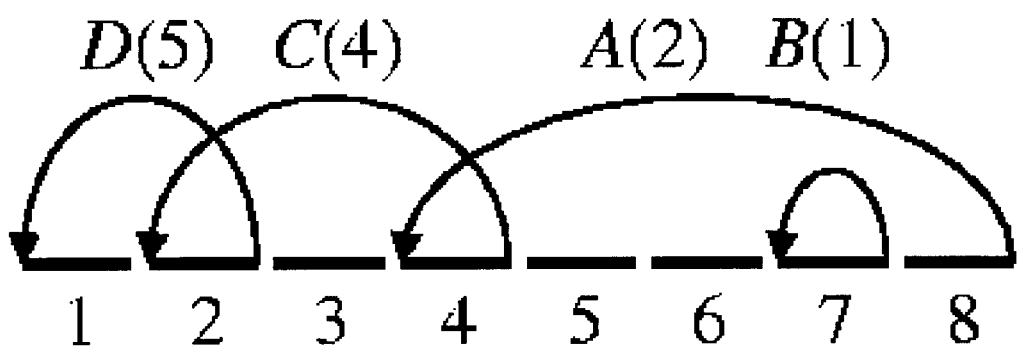
FIG. 10 is an example of a dynamic programming table used to find the lowest cost compound loop of a given length that includes the primitive loop at the top of the table.
FIG. 13 is a diagram illustrating the actions associated with the primitive loop scheduling process of FIG. 12.

Specifically, the procedure constructs a dynamic programming table, such as the one shown in FIG. 10, of L rows, where L is the maximum loop length being considered, and N columns, where N is the number of primitive loops or backwards transitions being considered. The algorithm builds up a list of the low cost compound loops of a given length that contains at least one instance of the jump listed at the top of the column. Each cell in the table lists the transitions in the compound loop and its total cost.

In regards to computing the loop costs for the dynamic programming table, the previously-discussed future cost computations are not applied when creating the transition cost matrix. Further, as indicated previously, the goal is to produce video loops that exhibit a relatively low total cost. This total cost is the sum of the individual costs of all the transitions taken. In order to reduce the amount of processing required to identify the low cost video loops having the desired length, a modified transition pruning procedure can be implemented. Specifically, after pruning all transitions which are not local minima in the difference matrix, the average cost for each transition is computed, and only the best N transitions (and so primitive loops) are considered in the synthesis process. In tested embodiments, a N of approximately 20 was employed. Another method of reducing the number of primitive loops to be considered in building video loops that could be used would entail eliminating all the primitive loops that have average transition costs that exceed a prescribed maximum threshold. The video loop can then be produced using the remaining primitive loops.

It is noted that the same type of cost matrix pruning could also be used in connection with the continuous video embodiment prior to the future cost analysis to speed up the computation process.

Figure 11:
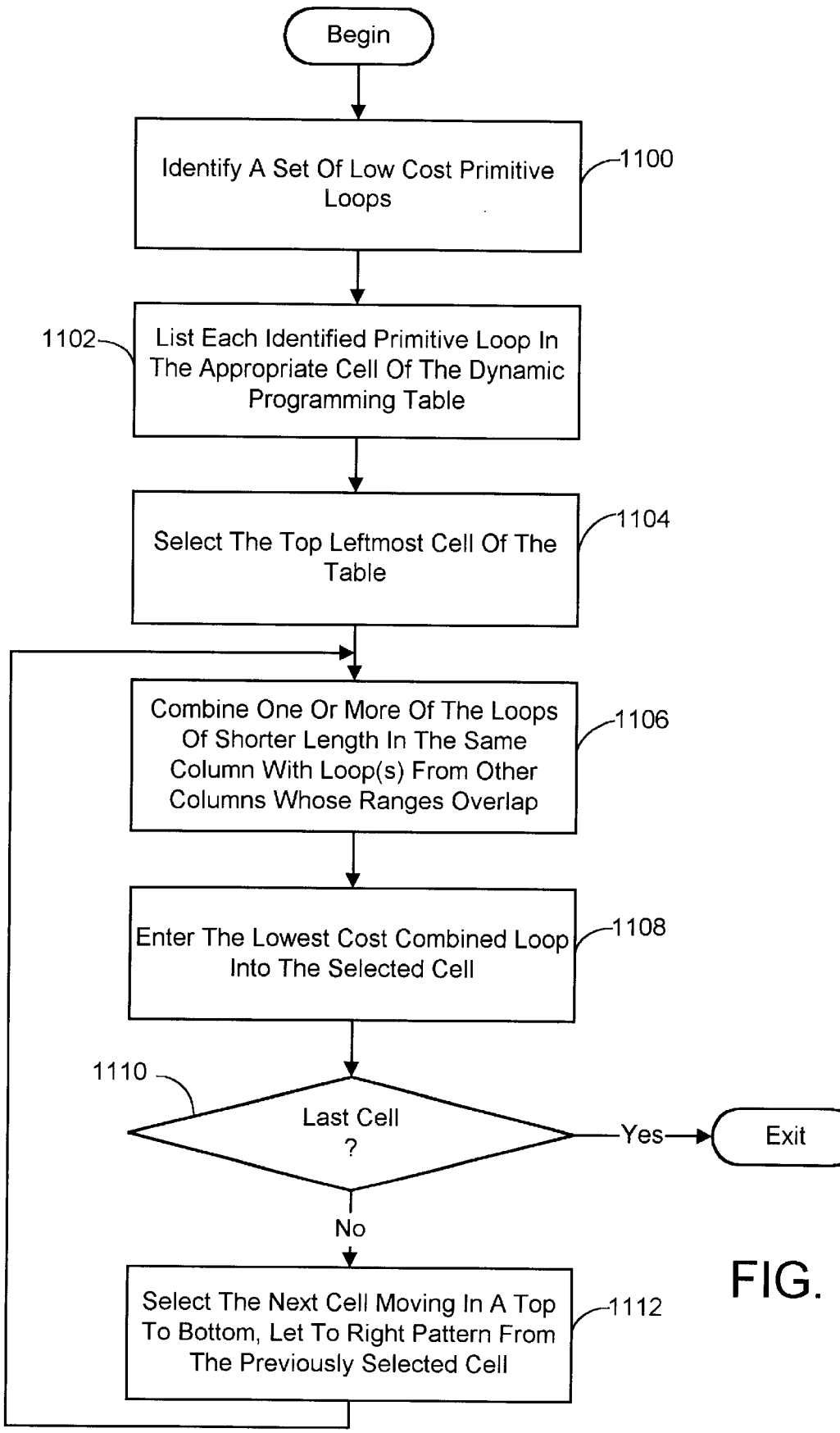
FIG. 11 is a flow chart diagramming a process for constructing a dynamic programming table in accordance with the fixed length video sequence process of FIG. 9.

Referring to FIG. 11, the video loop synthesis procedure begins by identifying a set of primitive loops that are to be used to construct the compound loops for the aforementioned dynamic programming table (process action 1100). This would preferably entail selecting the primitive loops remaining after the previously-described pruning procedure. In process action 1102, each identified primitive loop is placed in the appropriate cell in the table (i.e., row 1, column n or (1,n)). Next, the top leftmost cell is selected (process action 1104). All loops of shorter length in that same column are identified (which in the instance of the first cell is none), and an attempt is made to combine it/them with loops from columns whose range overlaps the column being considered (process action 1106). This ensures that the created compound loops are actually playable, since the ranges of the constituent loops must overlap. The attempted combination with the lowest total cost becomes the new entry for the cell (process action 1108). This process is then repeated for each successive cell by moving through the table in a top-to-bottom, left-to-right pattern, until the last cell is reached (process actions 1110 and 1112). For example, the entry in row 5 column C is obtained by combining the entry in row 3 column C with the entry in row 2 column D, which is possible since primitive loops C and D have ranges that overlap and have lengths that sum to 5. The combination with the lowest total cost becomes the new entry.

For each of the LN cells examined, the procedure combines at most L−1 compound loops from its column, with at most N−1 entries from the other columns. The total computational complexity of the algorithm is therefore $O(L^2 N^2)$, with a space complexity of $O(LN)$. Note that the full descriptions of the compound loops need not be stored during the computation phase: only backpointers to the originating cells of the constituent compound loops are needed.

2.3.2 Scheduling (Ordering) Of Loops

Figure 12:
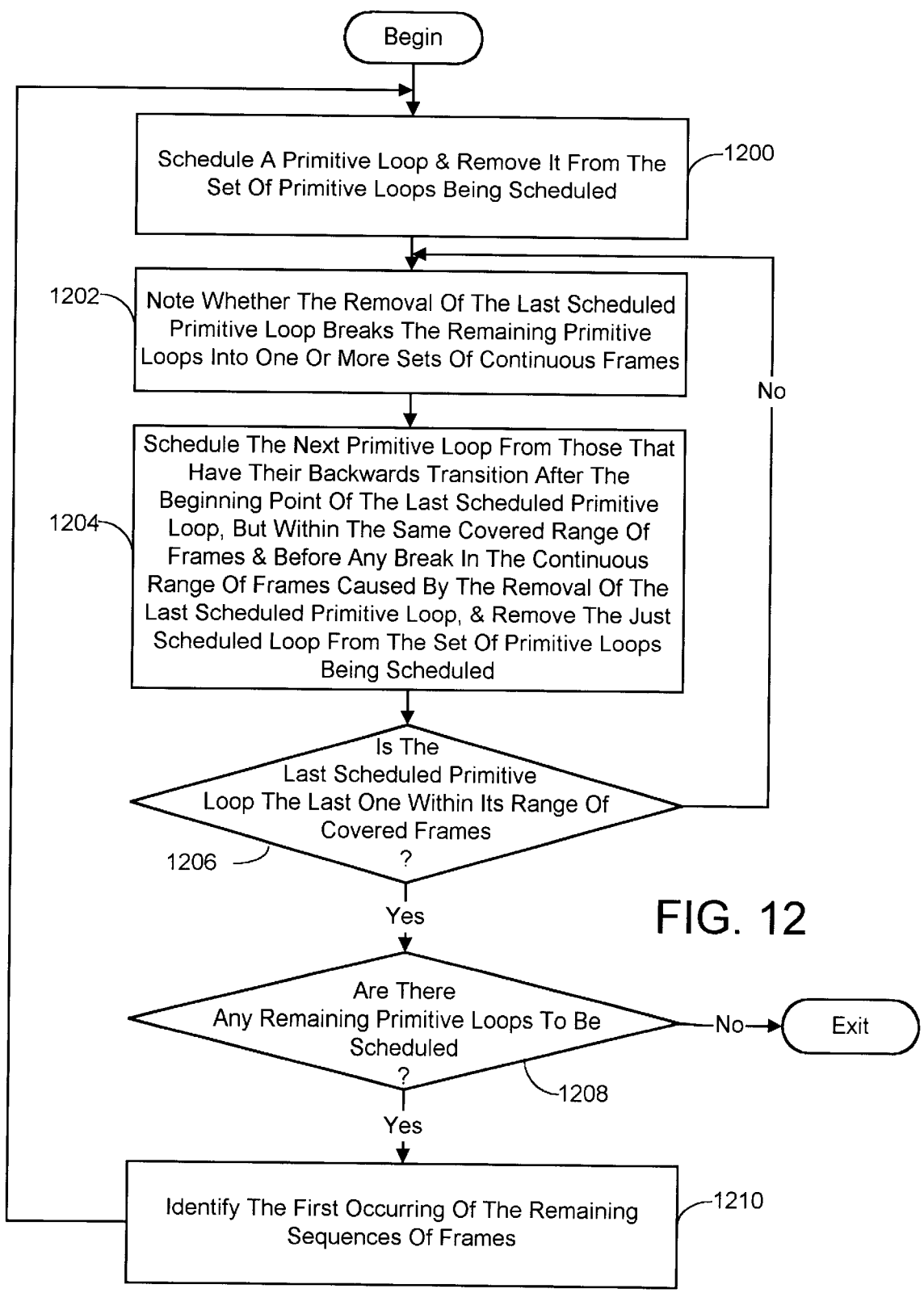
FIG. 12 is a flow chart diagramming a process for scheduling primitive loops in accordance with the fixed length video sequence process of FIG. 9.

After finding the list of primitive loops in the lowest cost compound loop for a particular loop length, the primitive loops (or transitions) are scheduled in some order so that they form a valid compound loop as described above. This is preferably done in accordance with the process outlined in FIG. 12 and visualized in the example shown in FIG. 13. The process begins by scheduling any one of the primitive loops and removing it from the set of jumps to be scheduled, as outlined in process action 1200. In the example shown in FIG. 13, the chosen loop is A. Next, it is noted whether the removal of the last scheduled primitive loop breaks the remaining primitive loops into one or more sets of continuous frames, as outlined in process action 1202. In FIG. 13, the removal of A breaks the remaining loops into two continuous-range sets, namely {C,D} and {B}. The next primitive loop is then scheduled from the remaining loops that have their backwards transition after the beginning point of the last scheduled primitive loop, but within the same covered range of frames and before any break in the continuous range of frames caused by the removal of the last scheduled primitive loop (process action 1204). In the example of FIG. 13, C is the only primitive loop that meets these criteria. The above-described primitive loop always exists, otherwise the removed loop would not have overlapped the first set and the overlapped range would not have been continuous to start with. Once scheduled, the primitive loop is eliminated from the set of loops still to be scheduled. It is next determined if the just scheduled jump is the last one within its range of covered frames, which means that it was the jump covering all its frames (process action 1206). If not, then process actions 1202 and 1204 are repeated until the last scheduled primitive loop is the last one within its range of covered frames. In the example of FIG. 13, D would be removed in the next iteration of process actions 1202 and 1204. When the last scheduled primitive loop is the last one within its range of covered frames, the process continues by determining if there are any remaining primitive loops to be scheduled (process action 1208). If so, the first occurring of the remaining sequence(s) of frames is identified (process action 1210) and the entire process (i.e., actions 1200 through 1210) is repeated until there are no more primitive loops to schedule. In the example of FIG. 13, B is the only primitive loop left to schedule. At the point where there are no more primitive loops to schedule, the procedure is complete. In the example depicted in FIG. 13, loops are scheduled in the order A-C-D-B.

The computational complexity of this procedure is quadratic in the number of primitive loops (or transitions) in the compound loop. It can either be run in a deterministic fashion (e.g., taking the first legal jump encountered), or in a stochastic fashion (randomly selecting from among the legally available jumps). The latter variant is an alternative to the Monte-Carlo sequencing algorithm discussed previously, which utilizes transitions with precisely the same frequency as in the compound loop.

It is noted that there is a drawback connected with choosing the lowest cost fixed length sequence as described above. The problem derives from the fact that the lowest cost compound loops may also coincide with the more boring movement to be found in the input video. This can be easily imagined because when there is little motion of an object of interest in a video, the frames capturing these movements will often be quite similar, thereby creating low cost transitions among them and so low cost loops. On the other hand, vigorous motion tends to produce less-similar frames, and so ultimately higher cost loops. This situation could be handled by ensuring more of the input video is put into the loopable fixed length sequences, thereby making it likely that less boring motion is included. One way to accomplish this would be to add a penalty term to the cost calculation for each compound loop such that.a higher cost is incurred if too little of the input video is used. This would make the compound loops containing more interesting motion potentially the lowest cost loop.

3. Rendering

The next phase in the generation of a new video sequence from the frames of the input video clip involves rendering the synthesized video. In regards to the continuous, non-looping video sequence, the new video is rendered by playing the frames of the input video clip in the order specified in the synthesizing process. In regard to the loopable, fixed length sequence embodiment, the primitive loops making up the compound loop defining the fixed-length video and their order were identified in the sequencing procedure described previously. Thus, the rendering of a loopable fixed length video sequence simply involves playing the input video frames in the order indicated in the synthesizing process. This can also include repeating the sequence as many times as desired since the last frame of the synthesized video sequence is designed to acceptably transition back to the first frame.

Although transitions that introduce only small discontinuities in the motion are favored, there are cases where no unnoticeable transitions are available in the sequence. This section describes techniques to disguise discontinuities in the video texture to make them less noticeable to the viewer, and also techniques for blending independently analyzed regions together.

Figure 14:
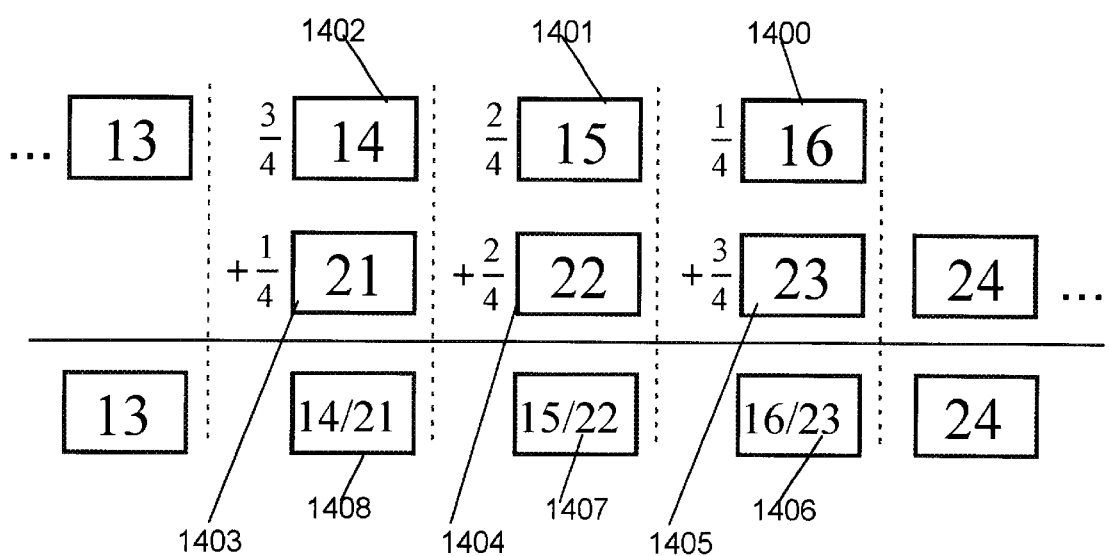
FIG. 14 is a diagram illustrating an example of a cross-fading smoothing technique used in conjunction with the rendering module of the overall process of FIG. 3.

Instead of simply jumping from one frame to another when a transition is made, the images of the sequence before and after the transition can be blended together via conventional blending methods. The second sequence is gradually blended into the first, while both sequences are running. FIG. 14 shows an example of this process, which is called crossfading. In this figure, the numbers inside the boxes represent frame numbers or combinations (blends) of frame numbers. Generally, in crossfading, frames from the sequence near the source of the transition are linearly faded out as the frames from the sequence near the destination are faded in. The fade is positioned so that it is halfway complete where the transition was scheduled. For example, referring to FIG. 14, the last three frames 1400–1402 of the video sequence prior to an unacceptable transition are respectively blended with the first three frames 1403–1405 of the video sequence after the transition. The ratio formula used dictates that last frame 1400 of the prior video sequence accounts for one-quarter of the blended is frame 1406 with the third frame 1405 of the subsequent sequence accounting for three-quarters of the blended frame. The two middle frames 1401, 1404 of the sequence are blended equally to produce blended frame 1407. And finally, the third to last frame 1402 of the prior video sequence accounts for three-quarters of the blended frame 1408 with the first frame 1403 of the subsequent sequence accounting for one-quarter of the blended frame.

Although crossfading of the transitions avoids abrupt image changes, it temporarily blurs (or more accurately causes ghosting in) the image if there is a misalignment between frames, which can be noticeable to the viewer depending on scene content. Specifically, the transition from sharp to blurry and back again is sometimes noticeable. In some situations, this problem can be addressed by taking very frequent transitions so that several frames are always being cross-faded together, maintaining a more or less constant level of blur. The preferred implementation of the cross-fading procedure supports multi-way cross-fades, i.e., more than two sub-sequences can be blended together at a time. The procedure computes a weighted average of all frames participating in a multi-way fade, $$B(x, y) = \sum_i \alpha_i I_i(x, y) \qquad (9)$$

where the blending weights as are derived from the shifted weighting kernels associated with each participating frame, normalized such that $\Sigma_i \alpha_i = 1$.

To reduce blurriness in the images, simple blending can be replaced by morphing two sequences together, so common features of the two sequences of frames are aligned. The method used is preferably based on a de-ghosting algorithm such as that presented in [3], and is also related to automatic morphing techniques, such as presented in [4].

To perform the de-ghosting, the optical flow between all frames $I_i$ participating in the multi-way morph and a reference frame $I_R$ (the reference frame is the one that would have been displayed in the absence of morphing or cross-fading) is computed. For every pixel in $I_R$, a consensus position for that pixel is found by taking a weighted average of its corresponding positions in all of the frames (including itself). Then, the flow measurements are corrected by the difference between the consensus and original pixel positions (this prevents the morph from jumping around to always match features in the reference frame). Finally, a standard inverse warping algorithm is used to resample the images and then blend them together.

4. Extensions

4.1 Motion Factorization

Motion factorization, in general, is a technique to divide the random process that generates the video texture into independent parts. It decreases the number of frame samples necessary to synthesize an interesting video texture. Interdependences between different parts of the synthesized frames can also be added with supplemental constraints.

4.1.1 Independent Motion

Independent regions of motion are a simple form of motion factorization. The random process of the whole video image is divided into less random processes that each describe a patch of the image. The sampled state space is no longer just the set of images, but rather the Cartesian product of all patch samples.

Figure 15:
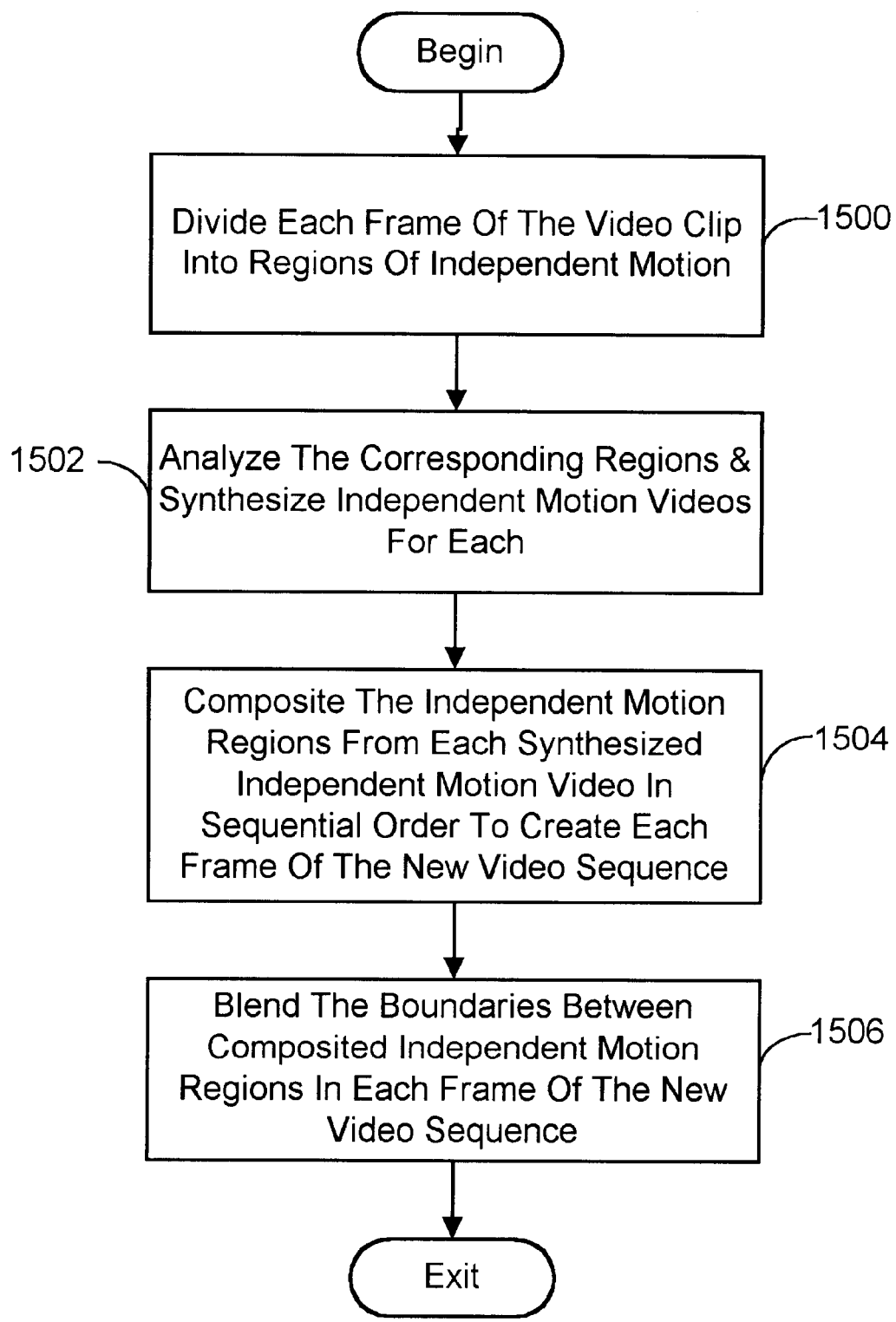
FIG. 15 is a flow chart diagramming a process for rendering a new video sequence from an input video clip that depicts regions of independent motion.

For example, some scenes are characterized by multiple, independent (i.e., non-overlapping), but repetitive, motions. Balloons tied at various locations in a tree is a good example. Each balloon moves in the wind and tends to exhibit a repetitive motion. Thus, if the scene were of one balloon only, there would be many potential low cost transitions available from the input video to create the desired synthesized video. However, with multiple balloons, the chances that they all are at the same approximate positions in more than one frame of the input video is slim. This makes the use of the methods discussed so far difficult. Referring to FIG. 15, the solution to the problem is to first divide each frame of the input video clip into regions of independent motion (process action 1500). The corresponding regions in each frame are then analyzed and videos are synthesized for each independent motion region (process action 1502), using any of the previously described processes. Thus, in the balloon example, each balloon contained within a region that does not overlap the region of motion of another balloon can be separated out of the input video frames and analyzed separately. If the region of motion of two or more balloons overlaps, then the process is the same except that the "overlapping" balloons would have to be analyzed together. If the number is small there should still be some useable degree of repetitiveness. The independent motion regions can be found using a conventional motion estimation algorithm to run over images and find the areas that do not change from frame to frame (i.e., the pixel characteristics do not change). Essentially, each region in the images that is separated by these non-changing areas would be designated as the independent motion region.

The rendering process associated with a video clip that has been analyzed and synthesized on a regional basis via the independent motion technique includes an additional procedure to create new frames from the extracted regions of the original input video. Essentially, each new frame of the rendered video is created by compositing the independent motion regions from the synthesized independent motion video based on the order of the frames specified in those videos (process action 1504). For example, the first frame of the rendered video is created by compositing the extracted regions specified as being first via the synthesis process performed for each independent motion region. This is accomplished using conventional compositing techniques. The compositing procedure is then repeated to create the second frame of the synthesized video using the second specified extracted regions for each independent motion region, and so on, as needed, to create the frames for the desired new video. To avoid seams between the independent motion regions, the boundary areas can be blended together in each composite frame to smooth the transition, again using any appropriate conventional technique (process action 1506). For example, in tested embodiments a feathering approach commonly used for image mosaics [5] was employed to accomplish the desired blending.

4.1.2 Translation And Deformation Motion

Figure 16:
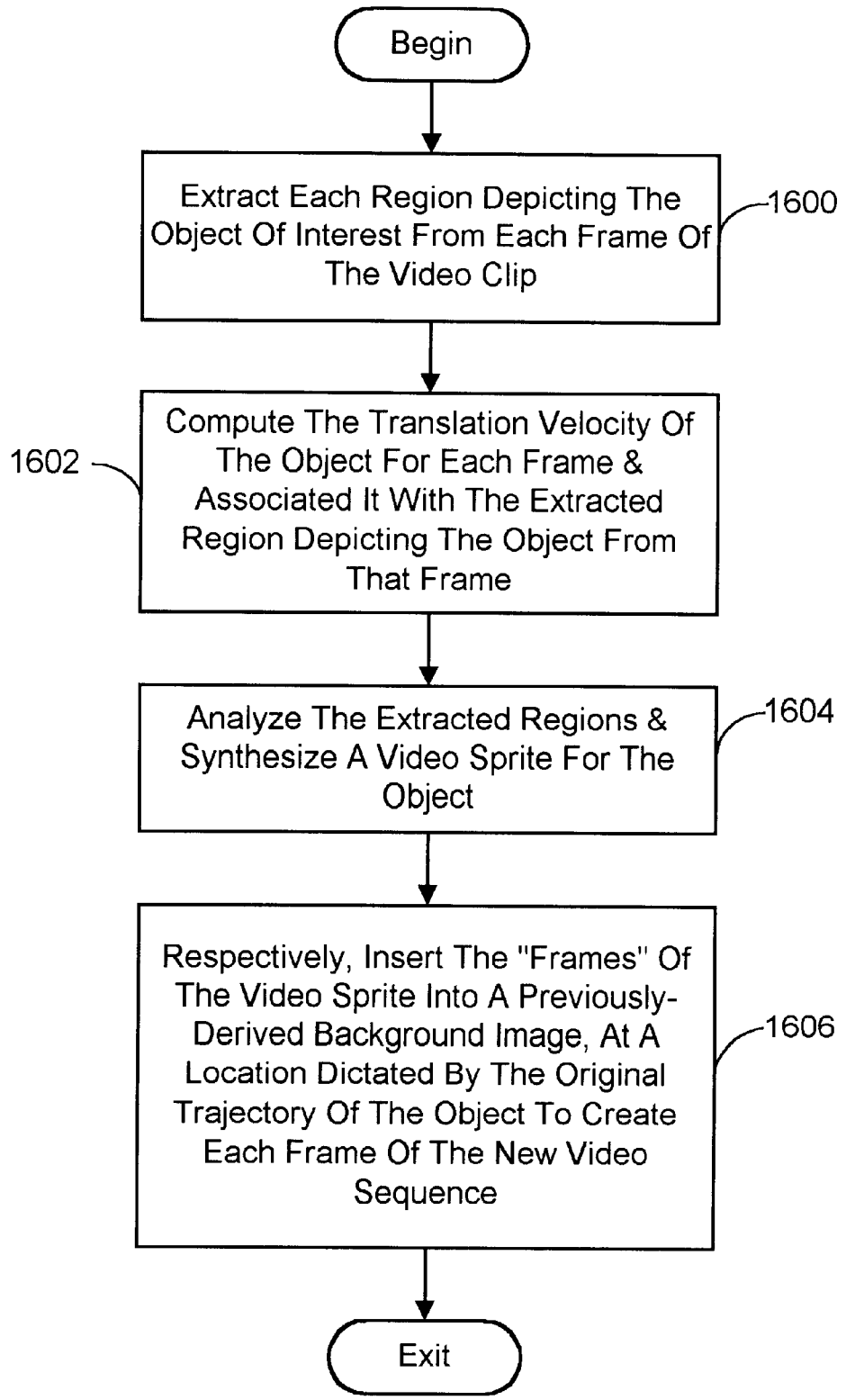
FIG. 16 is a flow chart diagramming a process for rendering a new video sequence using a video sprite which depicts the motion of an object extracted from the frames of an input video clip.

The same concept can be used for moving objects like animals, vehicles, and people. They typically exhibit a generally repetitive motion, independent of their position. Therefore, the motion captured in one location can be used to re-render motion in some other location. However, a problem arises in that since the moving object may never be in the same place in the scene, the previously described methods could not be used directly to create a synthesized video, despite the fact that the localized motion of the object is repetitive and ideal for the foregoing analysis. The solution to the problem is to factor the motion into local deformations and global translation. Referring to FIG. 16, this can generally be accomplished by first extracting the region containing the object of interest from each frame of the input video clip (process action 1600). For example, a conventional background subtraction technique could be employed for this purpose. As for the translation, it is assumed that the motion can be described by 2D translation in the image plane. Conventional techniques are then used to compute the translation velocity of the object for each frame, which is then assigned to the extracted region depicting the object associated with that frame (process action 1602). For example, a "blob" analysis could be employed where the motion of the blob's centroid is used to compute blob velocity. The extracted regions from each frame are then used as the input video frame (e.g., by placing the regions' centroids at the origin of each frame), analyzed, and then a video of the object is synthesized, via the previously described methods (process action 1604). The resulting video is referred to as a video sprite.

It is noted that the speed of the object through the scene may vary. This in turn could affect the similarity calculations used in the analysis. For example, the orientation of the object may be very similar in two frames of the input video, however, it may be very dissimilar in neighboring frames owing to differences in the translation velocity. Thus, for example, given points on the original trajectory derived from consecutive frames of the input video clip, frames could be chosen based on similarity alone. However, this might result in the appearance of the object moving very fast while traversing the scene slowly, or vice versa. Accordingly, the translation velocity could also be factored into the similarity calculations to ensure truly smooth transitions in the synthesized video.

More specifically, the difference in velocity between blobs (between consecutive frames of the input video clip) can be added to the total distance metric as follows. The distance between blob images $B_i$ and $B_j$ with velocities $v_i$ and $v_j$ is computed as:

$$D_{ij}=\alpha|B_i-B_j|^2+\beta|v_i-v_j|^2, \qquad (10)$$

where $\alpha$ and $\beta$ are weighting constants. This modified distance metric is then used as described previously to create the video texture representations, which are in turn used to synthesize and render new video sequences.

The rendering process associated with a video clip that has been analyzed and synthesized via the foregoing translation and deformation motion technique includes an additional procedure to create new frames from the video sprite of the object of interest derived from the original input video clip. Essentially, each new frame is created by inserting the extracted regions depicting the object (i.e., the "frames" of the video sprite) into a previously generated background image in the order specified by the synthesis procedure associated with the video sprite. Each frame of the video sprite is inserted at a location dictated by the path of the object in the scene (process action 1606). For example, the first frame is created by inserting the extracted region specified as the first by the synthesis process. This is accomplished via conventional insertion techniques. The location in the background image or frame where the extracted region is inserted corresponds to the first point in the path of the object in the synthesized video, which is the same as that in the original video clip. This can be done by making the centroid of the inserted extracted region correspond with the desired path point. The insertion procedure is then repeated to create the second frame of the synthesized video using the second specified extracted region and the second trajectory point, and so on, as needed, to synthesize the desired video.

As an example, a tested embodiment of the present video-based rendering system and process was used to render a fish in a fish tank. The fish was extracted from the scene using a conventional background subtraction process. It is noted that only those subsequences where the fish is swimming freely were used because the image of the fish was hard to extract from frames where the fish was near the sides of the tank due to reflections in the glass.

4.2 Video-Based Animation

While the foregoing processes have been described as producing synthesized video which depicts essentially the same scene as the input video, this need not be the case. Rather, using compositing and insertion techniques similar to those employed with the independent motion and translation/deformation procedures, entirely new scenes could be created. This rendering of new scenes from the frames of a input video clip will be referred to as video-based animation.

4.2.1 Adding Video Sprites

A simple embodiment of the aforementioned video-based animation involves adding moving objects into the new video sequence to create a scene that never existed in the original input video clip. For example, a previously synthesized video sprite of a waving flag or waterfall could be added to a scene of a new video sequence where none existed in the input video clip used to generate the video.

4.2.2 User-Controlled Frame Selection

The concept of video-based animation can be taken even further. For example, the previously described analysis process could be modified to allow a user to influence the selection of frames so as to direct the motion in the rendered video. One way of accomplishing this type of user-interaction is as follows.

Rather than having visual smoothness as the only criterion for generating video, it is also possible to introduce some user-controlled terms to the error function which influence the selection of frames. The simplest form of such user control is to interactively select the set of frames S in the sequence that are used for synthesis.

In this case, the cost computation portion of the analysis phase is performed as before, optionally pruning the list of transitions. However, the probabilities of the transitions are computed, using a modified form of equation (5), which takes into account the distance from the destination of the transition to the set of user-specified frames S:

$$P_{ij} \sim e^{-\frac{(F_{ij}+\beta \text{distance}(j,S))^p}{\sigma^p}} \quad (11)$$

Here, $\beta$ controls the relative weight of the user-control term to the smoothness of the transitions.

An example of this user-controller embodiment is a video sequence showing a runner running on a treadmill. The original video clip shows the runner starting slow and then speeding up. As the user moves a slider (e.g., a time bar like on a video player) selecting a certain temporal portion of the video, the synthesis attempts to select frames that remain within that portion of the video, while at the same time using only fairly smooth transitions to jump back in time. Thus, the user can control the speed of the runner in the generated video by moving the slider back and forth to select portions of the input video where the runner is running at the desired pace. It is noted that since the system attempts to find frames that form a smooth transition from one to the next, when the user selects frames of the input video associated with a different running pace, the runner makes natural-looking transitions between the different gaits in the generated video. Thus, a kind of "parametric motion control" results. This could easily be extended to other kinds of variants on running (higher kick, uphill/downhill), or other movements (say a sequence of dance or martial arts steps).

As another example, consider an input video clip of a watering can pouring water into a fountain. The central portion(in time) of this video, which shows the water pouring as a continuous stream, makes a very good video texture. It is possible to shorten or extend the pouring sequence by using the same technique as used above for the runner. Specifically, the user selection of the aforementioned center portion of the input video clip showing water pouring in a continuous stream would result in a user-controlled cost factor which would favor the selection of the frames in that portion of the video. Then, using the process described above for producing loopable, fixed length videos, a video of the water pouring that is shorter or longer than the original sequence in the center portion of the input video clip can be rendered. Thus, this user-influenced selection process can also be used to achieve a natural-looking time compression or dilation in a video sequence. Another example of the usefulness of the foregoing procedure is its use to shorten the running time of a video broadcast to achieve desired programming goals. The selection of frames associated with repetitive portions of the broadcast would be inhibited via the user-influence selection procedure, thereby allowing the synthesis of a time compressed video retaining the "substance" of the broadcast, but having a length shorter than the original.

4.2.3 User-Controlled Movement

Using-the translation and deformation motion factorization technique described above, the fish in the previously described example can follow its original path as defined by the extracted frames of the video clip that were used to render the new video sequence. However, it may be desired to constrain its motion to keep it within some fish tank area for example, or even specify its path of motion. To accomplish this, the trajectory could be specified by the user and would not mimic that of the input video. Thus, any path of the object through the scene could be synthesized.

Generally, this user-controlled movement involving a user-specified path can be accomplished as follows. Instead of directly specifying a preferred range of frames, as with the user-controlled frame selection embodiment, the user specifies successive points along a desired path through a background scene. Using the previously-described video sprite of fish swimming in a fish tank as an example, suppose a user specifies the desired path of the fish by selecting consecutive points in a scene. For example, the user could select points in a background image displayed on a computer monitor that depicts a fish tank by moving a cursor along a desired path that the fish is to swim in the new video animation. Frames of a video sprite showing the fish swimming would be selected and inserted in a background image of the fish tank along the user-specified path. However, the velocity of the fish in the selected frames would be taken into consideration. As described previously, this is important to avoid the possibility of the selected frames depicting the fish as having a swimming motion that appears too slow or too fast compared to the translation speed of the fish through the water. In other words, it might appear that the fish is swimming very fast but only moving a short distance in the scene, or that fish is swimming very slowly but moving a great distance in the scene. Thus, considering not only the smoothness of the transition between frames but also the velocity of the fish associated with those frames, the process of selecting frames and inserting the selected sprite frame at appropriate points along the desired path can be coordinated so that the fish's local deformation appears to match its translation across the scene in the new video.

The generation of an new video animation featuring a fish swimming in a fish tank has been used in the foregoing description of user-controlled movement as an example only. The same principles apply in general to any video sprite generated from an input video of an object that translates across the scene while deforming locally. Thus, it is possible for a user to generate an animation of any actor in the scene, such as a person or animal, moving along a specified path. While the actor is moving, it is deforming appropriately—for example, a person walks, a bird flies and a fish swims while it translates.

Figure 17:
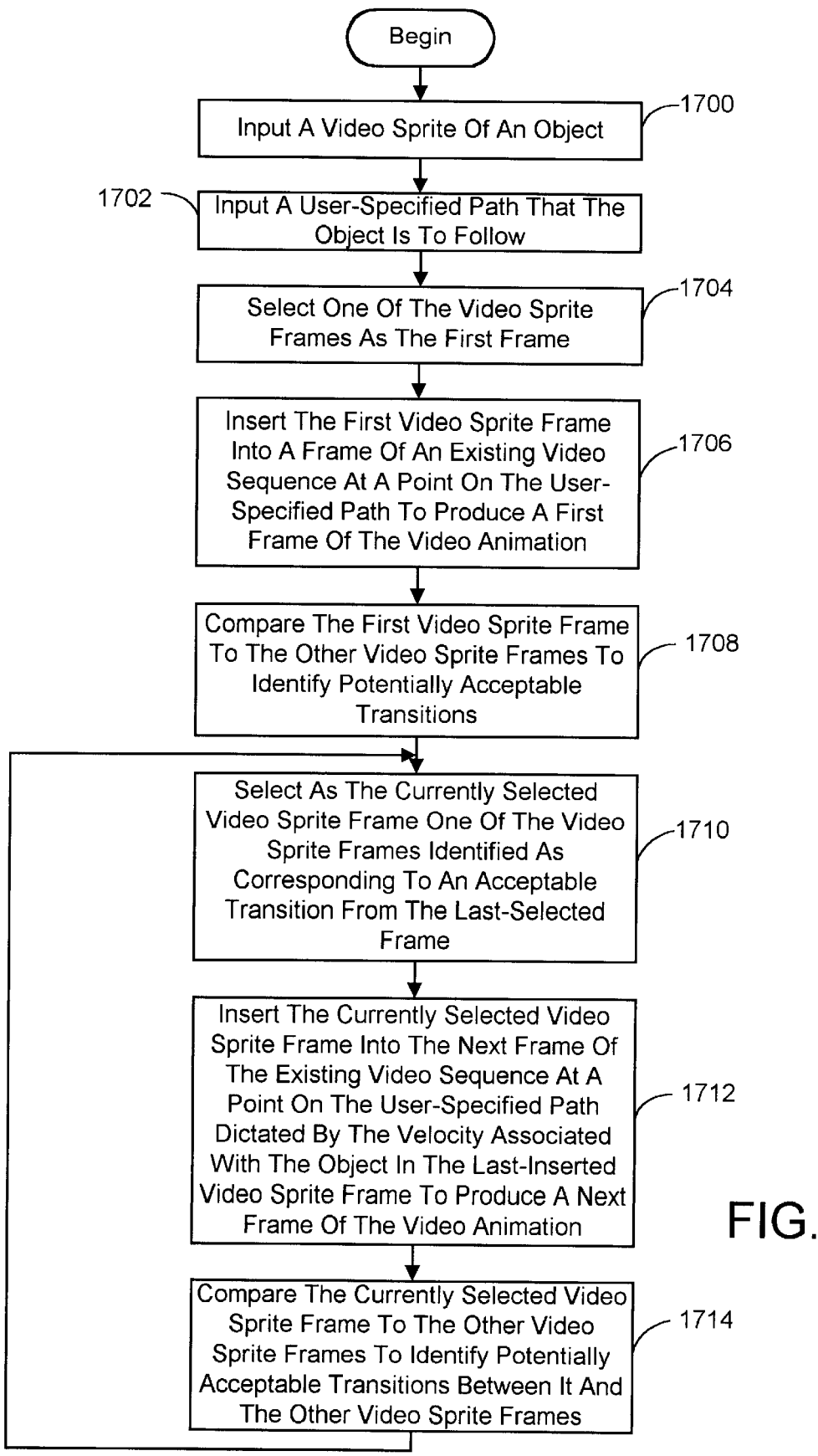
FIG. 17 is a flow chart diagramming a process for generating a video animation using a video sprite and a user-specified path according to the present invention.

More specifically, the user-controlled movement embodiment involving a user-specified path can be implemented as outlined in FIG. 17. First, a video sprite of an object it is desired to feature in the video animation is input into the system (process action 1700). The video sprite can be generated using the process described in Section 4.1.2, although in general any video that depicts an object moving in place can be employed. A user-specified path is input next as indicated in process action 1702. This could be accomplished by requiring the user to specify a series of points along the desired path. Or, as mentioned previously, the user could supply the path points by moving a cursor about a background image in the desired path. In such a case, the system employed to capture the user-specified path will preferably define the path as a series of consecutive points which are periodically recorded as the user moves the cursor arrow. The period between the recording of the path points and how the point coordinates are determined will vary depending on the system employed. Next, one of the frames of the video sprite is selected as the first frame (process action 1704), and it is inserted into a frame of an existing video sequence at a point on the user-specified path to produce the first frame of the video animation (process action 1706). The existing video sequence can simply be multiple copies of the background image mentioned previously. However, it is also possible to use a video sequence that changes over time. For example, in the fish tank example, the existing video sequence might depict the fish tank with bubbles rising to the surface. The sprite frame is preferably inserted as described previously in Section 4.1.2. In addition, the point along the path that the first video sprite frame is inserted could be chosen arbitrarily, or a starting point could be specified by the user, as desired. The previously-selected frame of the video sprite is then compared to the other video sprite frames to identify potentially acceptable transitions between the selected frame and the other frames (process action 1708), and a video sprite frame that is identified as corresponding to an acceptable transition from the last-selected frame is selected (process action 1710). This frame is designated as the currently selected video sprite frame in lieu of the last-selected frame. The new currently-selected frame is then inserted into the next consecutive frame of the aforementioned existing video sequence at a point along the user-specified path dictated by the velocity associated with the object in the last-inserted frame (process action 1712). In other words, the velocity of the selected frame of the video sprite is used to calculate how far the object will travel along the path in one frame's time. The sprite frame is then inserted, again as described previously in Section 4.1.2, at the point along the path that is at the calculated distance from the previous location of the object. The result of the insertion action is the creation of the next frame of the animated video. The currently-selected frame of the video sprite is next compared to the other video sprite frames to identify potentially acceptable transitions between it and the other frames, just as was done with the first video sprite frame (process action 1714). Process actions 1710 through 1714 are repeated for as long as it is desired to produce new frames of the video animation, as indicated in FIG. 17. It is noted, however, that the process could also end if the user specified path ends. To avoid this, the present system can be designed such that the user specifies a looped path and the generation of the new video animation would continue using the previously specified path points for as long as it is desired to generate the video.

In regard to the above-described process actions (i.e., 1708 and 1714 of FIG. 17) involving comparing a selected video sprite frame with all the other video sprite frames to identify acceptable transitions, they are preferably accomplished as follows. Let x be the current position of the object, y be the desired position of the object (say the aforementioned next "recorded" point along the user-specified path), $v_i$ the velocity at frame i, and E (x, v) some error function based on the user selected position, which is used to augment the frame metric. Then:

$$D_{ij}^{directed} = \alpha|I_i - I_j|^2 + \beta|v_i - v_j|^2 + \gamma E(y - x, vj). \quad (12)$$

In tested embodiments of the user-controlled movement procedure, a simple moving direction error metric was employed:

$$E(y-x,v_j)=-(y-x)\cdot v_j \quad (13)$$

Using this equation, the directed cost matrix ($D_{ij}^{directed}$) for the current position of the object can be calculated. However, it is noted that a problem similar to the dead-end issue described previously can occur. To account for future transition cost the future cost $F_{ij}$ is computed from the position-independent part of $D_{ij}^{directed}$, i.e., $\alpha|I_i-I_j|^2=\beta v_i-v_j|^2$ as described in section 1 and then the position-dependent part is added to obtain the final future cost:

$$F_{ij}^{directed}=F_{ij}+E(y-x,v_j) \quad (14)$$

Once the directed future cost matrix has been calculated, the process described in Section 1 for mapping the costs to probabilities (i.e., Eq. 5), and designating the frames having a transition representing a probability maximum as frames with acceptable transitions from the previously selected frame, is employed.

Figure 18:
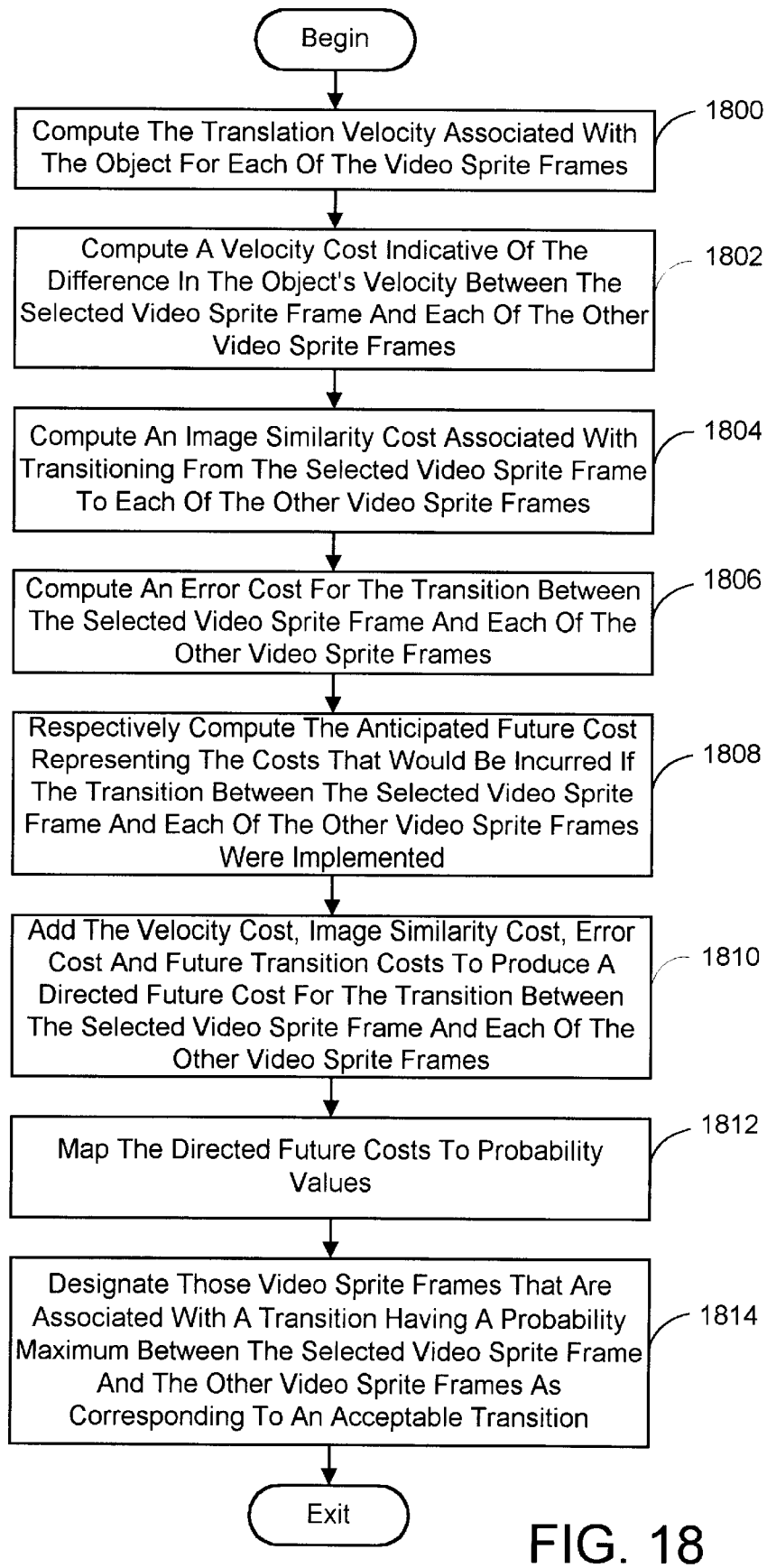
FIG. 18 is a flow chart diagramming a process for comparing a selected video sprite frame to the other video sprite frames to identify potentially acceptable transitions in accordance with the comparison module of the process of FIG. 17.

Thus, the process flow outlined in FIG. 18 can be used to perform the aforementioned comparison action. First, in process action 1800, the translation velocity associated with the object for each of the frames of the video sprite is computed. These velocities are used in process action 1802 to compute a velocity cost indicative of the difference in the object's velocity between the currently selected frame (which may be the first frame) and each of the other video sprite frames. In addition, an image similarity cost associated with transitioning from the selected frame to each of the other frames is computed using the procedures described in Section 1. Next, the aforementioned error cost related to the user-specified path is computed between the selected video sprite frame and each of the other frames (process action 1806). As indicated above, this error cost is a function of the distance between the next recorded point in the user-specified path and the current position of the object in the path, as well as the velocity of the "other" frame under consideration. An anticipated future transition cost representative of the transition costs that would be incurred if the transition between the selected video sprite frame and each of the other frames were implemented is also respectively computed for each of the other frames (process action 1808). As indicated in process action 1810, the velocity cost, image similarity cost, error cost and future transition cost are added together to produce a directed future cost for the transition between the selected video sprite frame and each of the other video sprite frames. These directed future costs are then mapped to probability values using a monotonically decreasing function to produce a probability distribution for the costs (process action 1812). And finally, those video sprite frames that are associated with a transition having a probability maximum between the selected video sprite frame and the other video sprite frames are designated as corresponding to an acceptable transition (process action 1814).

The user-directed video sprites are an alternative to traditional animation where using easily and cheaply acquired video footage makes elaborate hand modeling unnecessary. This technique can also be extended to many forms of user interaction and various applications. For example, the foregoing description discusses a user-specified path and provides an example of a user inputting a points of the desired path, however this direct user input is not imperative to the present system and process. Rather, the path could be generated in other ways and input into the present system. One example, a path of an object could be generated using video capture techniques. Generally, video capture involves a system that tracks the motions of various parts of an actor. Thus, a path would be generated by the motions of the actor, which could be input in lieu of a direct user input scenario. Another example of an alternate path generation method would involve a path synthesized entirely by a computer. For example, a path for an object might be generated by a computer program that simulates or predicts movement of an object. Further, the motion path could be specified as in conventional keyframe animation instead of specifying it interactively. The technique could also be used to generate crowds and the error function can be enhanced to include behavioral aspects such as flocking. Accordingly, the path employed in the present user-controlled movement video rendering system and process can be generated in any number of ways and input into the present video based rendering system and method—not just via direct user input. To this end the term "prescribed path" will be used to generically refer a path specified by any method desired, including a path directly or indirectly specified by a user, or a computer.

4.3 Adding Sound

Adding sound to video textures is relatively straightforward. In essence, sound samples are associated with each frame and played back with the video frames selected to be rendered. To mask any popping effects, the same multi-way cross-fading technique described previously in connection with rendering new video can be employed. It is also necessary to do the bookkeeping to make sure the right number of sound samples are emitted, since typically the audio and video clocks are not even multiples of each other. In tested embodiments, the resulting sound track has been found to sound very natural.

References

[1] Charles E. Jacobs, Adam Finkelstein, and David H. Salesin. Fast multiresolution image querying. *Proceedings of SIGGRAPH 95*, pages 277–286, August 1995.

[2] M. Hansen, P. Anandan, K. Dana, G. van der Wal, and P. Burt. Real-time scene stabilization and mosaic construction. In Image *Understanding Workshop*, pages 457–465, Monterey, Calf., November 1994. Morgan Kaufmann Publishers.

[3] H.-Y. Shum and R. Szeliski. Construction and refinement of panoramic mosaics with global and local alignment. In *Sixth International Conference on Computer Vision* (ICCV'98), pages 953–958, Bombay, January 1998.

[4] D. Beymer. Feature correspondence by interleaving shape and texture computations. In *IEEE Computer Society Conference on Computer Vision and Pattern Recognition* (CVPR'96), pages 921–928, San Francisco, Calif., June 1996.

[5] R. Szeliski and H.-Y. Shum. Creating full view panoramic image mosaics and texture-mapped models. In *Computer Graphics (SIGGRAPH'97) Proceedings*, pages 251–258, Los Angeles, August 1997. ACM SIGGRAPH.

[6] T. Kanade, P. W. Rander, and P. J. Narayanan. Virtualized reality: constructing virtual worlds from real scenes. *IEEE MultiMedia Magazine*, 1(1):34–47, Jan–March 1997.

[7] J. Shade, S. Gortler, L.-W. He, and R. Szeliski. Layered depth images. In *Computer-Graphics (SIGGRAPH'98) Proceedings*, pages 231–242, Orlando, July 1998. ACM SIGGRAPH.

Wherefore, what is claimed is:

1. A computer-implemented process for generating a video animation from image frames taken from an input video clip, comprising using a computer to perform the following process actions:

(a) inputting a video sprite of an object, said video sprite comprising a sequence of frames that when viewed in order shows the object moving in place;

(b) inputting a prescribed path that the object is to follow in the scene depicted in the video animation;

(c) selecting one of the video sprite frames as the first video sprite frame;

(d) inserting the selected first video sprite frame into a frame of an existing video sequence at a point on the prescribed path in the scene depicted therein to produce a first frame of the video animation;

(e) comparing the selected first video sprite frame to the other video sprite frames to identify potentially acceptable transitions between it and the other video sprite frames;

(f) selecting as a currently selected video sprite frame a video sprite frame from among the video sprite frames identified as corresponding to an acceptable transition from the last selected frame;

(g) inserting the currently selected video sprite frame into the next frame of the existing video sequence at a point on the prescribed path occurring after the point where the last inserted video sprite frame was inserted to produce a next frame of the video animation;

(h) comparing the currently selected video sprite frame to the other video sprite frames to identify potentially acceptable transitions between it and the other video sprite frames; and (i) repeating process actions (f) through (h) for as long as it is desired to produce new frames of the video animation.

2. The process of claim 1, wherein the process actions of comparing the selected first video sprite frame to the other video sprite frames to identify potentially acceptable transitions between it and the other video sprite frames, and comparing said currently selected video sprite frame to the other video sprite frames to identify potentially acceptable transitions between it and the other video sprite frames, comprises the actions of:

computing costs indicative of the similarity between each pair of compared video sprite frames;

mapping the costs to probability values using a monotonically decreasing function, and producing a probability distribution for the costs; and designating those other video sprite frames that are associated with a probability maximum between a video sprite frame under consideration and the other video sprite frames as corresponding to an acceptable transition from the video sprite frame under consideration.

3. The process of claim 2, wherein the process action of selecting a currently selected video sprite frame, comprising the action of selecting the currently selected video sprite frame by randomly choosing a frame which, according to the previously computed probability distribution, is among those designated as an acceptable transition from the video sprite frame under consideration.

4. The process of claim 2, wherein the process action of computing costs, comprises the actions of:

computing the translation velocity associated with the object for each of the video sprite frames in the pair of frames being compared;

computing a velocity cost indicative of the difference in said object's velocity between each of the video sprite frames in the pair of frames being compared;

computing a respective image similarity cost associated with transitioning from the selected video sprite frame to the other video sprite frame of the pair of frames being compared, said image similarity cost being indicative of how smooth the transition would appear to a person viewing the video sprite frames in sequence; and adding the image similarity cost associated with transitioning between the frame pair under consideration to the velocity cost associated with said frame pair to produce a combined cost for that transition.

5. The process of claim 4, wherein the process action of computing costs, further comprises an action of adding an error cost based on the prescribed path to each combined cost computed to produce a directed cost, wherein said error cost is a function of the distance between a next prescribed point in the prescribed path and the current position of the object in the path, and the velocity of the object depicted in said other video sprite frame of the frame pair associated with the combined cost.

6. The process of claim 5, wherein the error cost is a function of the distance between the next prescribed point in the prescribed path and the current position of the object in the path, multiplied by the velocity of the object depicted in said other video sprite frame of the frame pair associated with the combined cost.

7. The process of claim 4, wherein the process action of computing costs, further comprises an action of computing a future cost for each combined cost.

8. The process of claim 7, wherein the process action of computing each future cost comprises the actions of:

computing a future cost factor that represents the transition costs that could be incurred if the other video sprite frame of the frame pair associated with the combined cost is selected; and adding the anticipated future transition costs to the combined cost to produce the future cost.

9. The process of claim 8, wherein the process action of computing future costs, further comprises an action of adding an error cost based on the prescribed path to each future cost computed to produce a directed future cost, wherein said error cost is a function of the distance between a next prescribed point in the prescribed path and the current position of the object in the path, and the velocity of the object depicted in said other video sprite frame of the frame pair associated with the future cost.

10. The process of claim 9, wherein the error cost is a function of the distance between the next prescribed point in the prescribed path and the current position of the object in the path, multiplied by the velocity of the object depicted in said other video sprite frame of the frame pair associated with the future cost.

11. The process of claim 1, wherein the process action of inputting the prescribed path, comprises an action of inputting a series of consecutive point coordinates defining the prescribed path.

12. The process of claim 11 wherein the process action of inputting the prescribed path, comprises an action of inputting a looping path such that there is no specific beginning or ending point in the path.

13. The process of claim 1, wherein the frames of the video animation are produced at a prescribed frame rate, and wherein the process action of inserting the currently selected video sprite frame into the next frame of the existing video sequence, comprises an action of inserting the currently selected video sprite frame at the point in prescribed path that the object would have traveled along the path from the point at which the last-inserted video sprite frame was inserted at the velocity associated with the object in the currently selected video sprite frame in the time it takes to produce the next frame of the video animation at the prescribed frame rate.

14. The process of claim 1, wherein the process actions of inserting the selected first video sprite frame into a frame of an existing video sequence and inserting the currently selected video sprite frame into the next frame of the existing video sequence, comprise the actions of:

identifying the centroid of the object depicted in the video sprite frame being inserted; and inserting the object into the frame of the existing video sequence such that the centroid of the object corresponds to the point along the prescribed path that the video sprite is to be inserted.

15. The process of claim 1, wherein the existing video sequence comprises a sequence of identical background images.

16. A system for generating a video animation from image frames taken from an input video clip, comprising:

a general purpose computing device; and a computer program comprising program modules executable by the computing device, wherein the computing device is directed by the program modules of the computer program to,
(a) input a video sprite of an object, said video sprite comprising a sequence of frames that when viewed in order shows the object moving in place,
(b) input a prescribed path that the object is to follow in the scene depicted in the video animation,
(c) select one of the video sprite frames as the currently selected video sprite frame and insert it into a frame of an existing video sequence in the scene depicted therein at a point on the prescribed path,
(d) compare the currently selected video sprite frame to the other video sprite frames to identify potentially acceptable transitions between it and the other video sprite frames,
(e) select a video sprite frame from among the video sprite frames identified as corresponding to an acceptable transition from the last-selected frame, and designate it the currently selected video sprite frame in lieu of the last-selected frame,
(f) insert the designated currently selected video sprite frame into a next frame of the existing video sequence in the scene depicted therein at a point on the prescribed path occurring after the point where any last-inserted video sprite frame was inserted to produce a frame of the video animation, and
(g) repeat actions (d) through (f) for as long as it is desired to produce new frames of the video animation, employing the next consecutive frame of the existing video sequence when executing the insertion module to produce the next consecutive frame of the video animation.

17. The system of claim 16, wherein the program module responsible for comparing the currently selected video sprite frame to the other video sprite frames, comprises sub-modules for:

computing costs indicative of the similarity between each pair of compared video sprite frames;

mapping the costs to probability values using a monotonically decreasing function, and producing a probability distribution for the costs; and designating those other video sprite frames that are associated with a probability maximum between a video sprite frame under consideration and the other video sprite frames as corresponding to an acceptable transition from the video sprite frame under consideration.

18. The system of claim 17, wherein the program module responsible for selecting a video sprite frame from among the video sprite frames identified as corresponding to an acceptable transition, comprising a sub-module for selecting the-video sprite frame by randomly choosing a frame which, according to the previously computed probability distribution, is among those designated as an acceptable transition from the video sprite frame under consideration.

19. A computer-readable medium having computer-executable instructions for generating a video animation from image frames taken from an input video clip, said computer-executable instructions comprising:

(a) extracting a corresponding region from each of a selected number of frames of the input video clip, wherein the corresponding regions correspond in that they each depict the same object from the input video clip, regardless of the object's location in the frames thereof, and wherein each extracted region forms a frame of a video sprite;
(b) selecting one of the video sprite frames as a starting video sprite frame
(c) inputting a prescribed path which the object is to follow in the video animation;
(d) inserting the starting video sprite frame into a first frame of an existing video sequence at a starting point associated with the prescribed path to produce a frame of the video animation;
(e) comparing the selected starting video sprite frame to the other video sprite frames to identify potentially acceptable transitions between the selected starting video sprite frame and the other video sprite frames;
(f) selecting a next video sprite frame based on the identified acceptable transitions;
(g) inserting the currently selected video sprite frame into the next frame of the existing video sequence at a point in the prescribed path occurring after the point where the last inserted video sprite frame was inserted;
(h) comparing the currently selected video sprite frame to the other video sprite frames to identify potentially acceptable transitions between the currently selected video sprite frame and the other video sprite frames; and
(i) repeating instructions (e through (h) until the prescribed path ends.

20. The computer-readable medium of claim 19, wherein the instruction for comparing the selected video sprite frame to the other video sprite frames to identify potentially acceptable transitions between it and the other video sprite frames, comprises sub-modules for:

computing costs indicative of the similarity between each pair of compared video sprite frames;

mapping the costs to probability values using a monotonically decreasing function, and producing a probability distribution for the costs; and designating as a potentially acceptable transitions between the video sprite frame under consideration and the other video sprite frames only those transitions in which the probability value computed between the frame under consideration and another of the frames exceeds a prescribed minimum probability threshold.

21. The computer-readable medium of claim 20, wherein the instruction for selecting a next video sprite frame, comprising a sub-module for selecting the next video sprite frame by randomly choosing a frame which, according to the previously computed probability distribution, is among those designated as an acceptable transition from the video sprite frame under consideration.

* * * * *

UNITED STATES PATENT AND TRADEMARK OFFICE
CERTIFICATE OF CORRECTION

PATENT NO. : 6,600,491 B1
DATED : July 29, 2003
INVENTOR(S) : Szeliski et al.

It is certified that error appears in the above-identified patent and that said Letters Patent is hereby corrected as shown below:

<u>Column 3,</u>
Line 46, "the.dynamics" should be changed to -- the dynamics --

<u>Column 4,</u>
Line 52, "where-there" should be changed to -- where there --

<u>Column 14,</u>
Line 52, "a" should be changed to -- $\alpha$ --

<u>Column 16,</u>
Line 41, "$D'_{i+1j}$," should be change to -- $D'_{i+1,j}$, --

<u>Column 17,</u>
Line 2, "$F_{ij}=D'_{i+1j}$" should be changed to -- $F_{ij}=D'_{i+1,j}$, --

<u>Column 20,</u>
Lines 4 and 5, "1" should be changed to -- I --

<u>Column 21,</u>
Line 36, "that.a" should be changed to -- that a --

UNITED STATES PATENT AND TRADEMARK OFFICE
CERTIFICATE OF CORRECTION

PATENT NO. : 6,600,491 B1
DATED : July 29, 2003
INVENTOR(S) : Szeliski et al.

It is certified that error appears in the above-identified patent and that said Letters Patent is hereby corrected as shown below:

Column 28,
Line 40, equation should appear as follows:

$$D_{ij}^{directed} = \alpha |I_i - I_j|^2 + \beta |v_i - v_j|^2 + \gamma E(y - x, v_j) \qquad (12)$$

Line 54, equation should appear as follows:

$$\alpha |I_i - I_j|^2 = \beta |v_i - v_j|^2$$

Signed and Sealed this

Twenty-third Day of September, 2003

JAMES E. ROGAN
*Director of the United States Patent and Trademark Office*